(12) United States Patent
Stalnaker et al.

(10) Patent No.: US 12,552,202 B2
(45) Date of Patent: Feb. 17, 2026

(54) SYSTEM, METHOD, AND TIRE AGING MODEL FOR QUANTIFYING FIELD USAGE SEVERITY OF MOTOR VEHICLE TIRES

(71) Applicant: Bridgestone Americas Tire Operations, LLC, Nashville, TN (US)

(72) Inventors: David O. Stalnaker, Akron, OH (US); Robert Palmer, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 209 days.

(21) Appl. No.: 18/278,440

(22) PCT Filed: Apr. 8, 2022

(86) PCT No.: PCT/US2022/024038
§ 371 (c)(1),
(2) Date: Aug. 23, 2023

(87) PCT Pub. No.: WO2022/217061
PCT Pub. Date: Oct. 13, 2022

(65) Prior Publication Data
US 2024/0131872 A1 Apr. 25, 2024
US 2024/0227460 A9 Jul. 11, 2024

Related U.S. Application Data

(60) Provisional application No. 63/172,879, filed on Apr. 9, 2021.

(51) Int. Cl.
*B60C 11/24* (2006.01)
*B60C 23/04* (2006.01)
(Continued)

(52) U.S. Cl.
CPC ........ *B60C 11/246* (2013.01); *B60C 23/0488* (2013.01); *B60C 23/20* (2013.01); *G07C 5/008* (2013.01)

(58) Field of Classification Search
CPC ........ B60C 23/20; B60C 11/246; B60C 23/04
(Continued)

(56) References Cited

U.S. PATENT DOCUMENTS 8,849,500 B2 9/2014 Gokyu et al.
9,050,864 B2 6/2015 Singh et al.
(Continued)

FOREIGN PATENT DOCUMENTS

JP 2005297751 A 10/2005
JP 2008298723 A 12/2008
(Continued)

OTHER PUBLICATIONS

International Search Report, corresponding application No. PCT/US2022/024038, Jul. 26, 2022, 5 pages.
(Continued)

*Primary Examiner* — Navid Z. Mehdizadeh
*Assistant Examiner* — Vincent Feng
(74) *Attorney, Agent, or Firm* — Kathie J. Kopczyk

(57) ABSTRACT

Systems and methods are disclosed herein for monitoring tire aging with respect to a motor vehicle and/or across vehicle fleets. A computing device (e.g., cloud server) is linked to vehicle-mounted data acquisition devices which provide signals corresponding to ambient temperature and contained air temperatures for respective tires. The computing device ascertains oxidative aging characteristics for the tires, based on at least the collected ambient temperature and respective contained air temperature, and respective rates of accumulation thereof with respect to time and/or distance traveled, and further ascertains the oxidative aging characteristics for each tire with respect to a fixed reference ambient temperature, and respective rates of accumulation thereof with respect to time and/or distance traveled. Selectively generated output signals correspond to monitored (Continued)

characteristics and respective rates of accumulation thereof for the respective tires. The oxidative aging characteristics may for example be ascertained at least in part via Arrhenius reaction rate integration.

20 Claims, 22 Drawing Sheets

(51) Int. Cl.
  *B60C 23/20* (2006.01)
  *G07C 5/00* (2006.01)
(58) Field of Classification Search
  USPC ........................................................ 701/29.3
  See application file for complete search history.

(56) References Cited

U.S. PATENT DOCUMENTS

| 9,873,293 | B2 | 1/2018 | Singh et al. |
| 9,878,721 | B2 | 1/2018 | Singh et al. |
| 10,603,962 | B2 | 3/2020 | Singh |
| 10,753,828 | B2 | 8/2020 | Tamura et al. |
| 2003/0214394 | A1 | 11/2003 | Behrendsen |
| 2006/0093015 | A1 | 5/2006 | Ichihara et al. |
| 2006/0152352 | A1* | 7/2006 | Moughler ............... B60C 23/04 340/438 |
| 2010/0132445 | A1 | 6/2010 | Tozawa et al. |
| 2016/0009290 | A1 | 1/2016 | Benedict et al. |
| 2016/0185429 | A1 | 6/2016 | Bergström |
| 2018/0154707 | A1 | 6/2018 | Singh et al. |
| 2018/0272813 | A1 | 9/2018 | Singh |
| 2018/0304697 | A1 | 10/2018 | Woodley et al. |
| 2019/0160886 | A1 | 5/2019 | Tamura et al. |
| 2019/0265129 | A1* | 8/2019 | Tamura ................. B60C 11/246 |
| 2019/0315165 | A1 | 10/2019 | Delacroix |
| 2020/0031184 | A1 | 1/2020 | Ukegawa et al. |
| 2020/0189327 | A1 | 6/2020 | Kintscher et al. |

FOREIGN PATENT DOCUMENTS

| JP | 2010167847 | A | 8/2010 | |
| JP | 2012013640 | A | 1/2012 | |
| JP | 2012116417 | A | 6/2012 | |
| JP | 2016223857 | A | 12/2016 | |
| WO | 2018109336 | A1 | 6/2018 | |
| WO | WO-2020190430 | A1 * | 9/2020 | ........... B60C 23/002 |
| WO | 2020205703 | A1 | 10/2020 | |

OTHER PUBLICATIONS

Japanese Office Action for corresponding patent application No. JP2023555697, Jul. 10, 2024, 6 pages.

* cited by examiner

SYSTEM, METHOD, AND TIRE AGING MODEL FOR QUANTIFYING FIELD USAGE SEVERITY OF MOTOR VEHICLE TIRES

TECHNICAL FIELD

The present disclosure relates generally to quantifying performance aspects of tires on wheeled motor vehicles. More particularly, systems, methods, and related algorithms as disclosed herein relate to aging metrics utilized to quantify the severity of operating and/or environmental conditions specific to a fleet, an individual motor vehicle in a fleet, or an individual tire position, for tires of wheeled motor vehicles including but not limited to motorcycles, consumer vehicles (e.g., passenger and light truck), commercial and off-road (OTR) vehicles.

BACKGROUND ART

Generally stated, various embodiments of systems and methods as disclosed herein may implement detected operating and/or environmental conditions associated with a motor vehicle, including for example ambient temperatures and/or contained air temperatures (CAT) associated with a given tire. The responses may preferably be measured directly using data acquisition systems, such as for example Tire Pressure Monitoring Systems (TPMS), which may be are mounted in, on, or otherwise in association with the tire. The data acquisition system may continuously collect data as the tire is rolling on different roads and surfaces, and further transmit such data via for example cellular communications networks to a central computing device such as a cloud server.

One of skill in the art may appreciate that contained air temperature is indicative of the severity of field operating conditions. High loads and speeds, low inflation pressures, high ambient temperatures and sun load may individually or collectively serve to increase the contained air temperature. The influence of tire temperature on tire life is not linear.

DISCLOSURE OF THE INVENTION

Embodiments of a system and method as disclosed herein may involve a methodology for calculating an Aging Unit (AU), based for example on the Arrhenius oxidative reaction rate equation and integration over a time/duration of a tire sampling period. Aging Units may be accumulated throughout the life of a tire, more rapidly when operating and/or environmental conditions are relatively severe, and more slowly when they are relatively mild. Some accumulation even occurs when the motor vehicle is parked. Each AU may be defined as an amount of oxidative aging that would occur under specified conditions—for example, if parked (i.e., not in operation) for one month in a 70° F. garage.

The rate at which AU's are accumulated, for example as indexed with respect to time or with respect to distance traveled ($AI_{time}$, $AI_{dist}$, respectively), may be used to compare motor vehicles, and/or vehicle fleet operations, with respect to another.

Measurements may further indicate the effects of tire positioning on the motor vehicle with respect to again, such as for example that an inside position of dual drive axles age more rapidly than the corresponding outside positions.

Measurements between vehicle fleets, such as for example line-haul and regional motor vehicle fleets, across the country may be compared to indicate relative differences in aging severity.

In order to better understand differences in operating conditions the influence of environmental conditions may also be removed. A modified metric such as a Delta Aging Unit (ΔAU) as further disclosed herein may specifically remove or otherwise account for ambient temperature effects by substituting them for a fixed 70° F. ambient temperature. In this way the tire severity of operating conditions of a motor vehicle operating in the southwest United States can be meaningfully compared to one operating in Canada without the influence of ambient conditions. The ΔAU can also be indexed to time and/or distance ($AI_{time}$, $AI_{dist}$, respectively).

An embodiment of a tire monitoring method as disclosed herein comprises collecting, via at least one data acquisition device mounted onboard a motor vehicle having a plurality of tires, at least signals corresponding to an ambient temperature and contained air temperatures for each of the plurality of tires. A computing device may be configured to ascertain oxidative aging characteristics for each of the plurality of tires, based on at least the collected ambient temperature and respective contained air temperature, and respective rates of accumulation thereof with respect to time and/or distance traveled. The oxidative aging characteristics for each of the plurality of tires may be further ascertained with respect to a fixed reference ambient temperature, and respective rates of accumulation thereof with respect to time and/or distance traveled. An output signal may be selectively generated corresponding to monitored characteristics and respective rates of accumulation thereof for one or more of the plurality of tires.

In an exemplary aspect according to the above-referenced embodiment, the oxidative aging characteristics may be ascertained at least in part via Arrhenius reaction rate integration.

Another exemplary aspect according to the above-referenced embodiment may include collecting, via the at least one data acquisition device, signals corresponding to one or more of vertical load, inflation pressure, and speed for each of the plurality of tires, wherein the rates of accumulation of the oxidative aging characteristics may be further ascertained with respect to the one or more of vertical load, inflation pressure, and speed for each of the plurality of tires.

Another exemplary aspect according to the above-referenced embodiment may include identifying a respective position on the motor vehicle for each of the plurality of tires, and predicting a tire life state based on the ascertained characteristics, and the respective rates of accumulation thereof, for each respective position on the motor vehicle of the plurality of tires. The output signal may be selectively generated corresponding to a determined intervention event for one or more of the plurality of tires.

Another exemplary aspect according to the above-referenced embodiment may be further provided with respect to each of a plurality of motor vehicles in a defined fleet. At least a respective motor vehicle is identified for each of the collected at least signals corresponding to an ambient temperature and contained air temperatures for each of the corresponding plurality of tires, and a tire life state is predicted based on the ascertained characteristics, and the respective rates of accumulation thereof, for each respective motor vehicle in the defined fleet. The output signal may be selectively generated corresponding to a determined intervention event for one or more of the plurality of motor vehicles.

Another exemplary aspect according to the above-referenced embodiment may be further provided with respect to each of a plurality of motor vehicles in each of a plurality of defined fleets. At least a respective motor vehicle and a respective fleet may be identified for each of the collected at least signals corresponding to an ambient temperature and contained air temperatures for each of the corresponding plurality of tires, and a tire life state is predicted based on the ascertained characteristics, and the respective rates of accumulation thereof, for each respective fleet. The output signal may be selectively generated corresponding to a determined intervention event for one or more of the plurality of fleets.

In another embodiment, a tire monitoring system may include at least one data acquisition device mounted onboard a motor vehicle having a plurality of tires and configured to generate at least signals corresponding to an ambient temperature and contained air temperatures for each of the plurality of tires. A computing device is communicatively linked to the at least one data acquisition device and configured to direct the performance of steps according to the above-referenced method embodiment and associated (optional) exemplary aspects.

In exemplary aspects of the above-referenced system, the computing device may for example be part of a cloud server system or a local electronic control unit.

In another embodiment, a computing device such as for example a cloud server system is independently provided, communicatively linked to data acquisition devices associated with one or more vehicles and configured to direct the performance of steps according to the above-referenced method embodiment and associated (optional) exemplary aspects.

BRIEF DESCRIPTION OF THE DRAWINGS

Hereinafter, embodiments of the invention are illustrated in more detail with reference to the drawings.

BEST MODE FOR CARRYING OUT THE INVENTION

Figure 1:
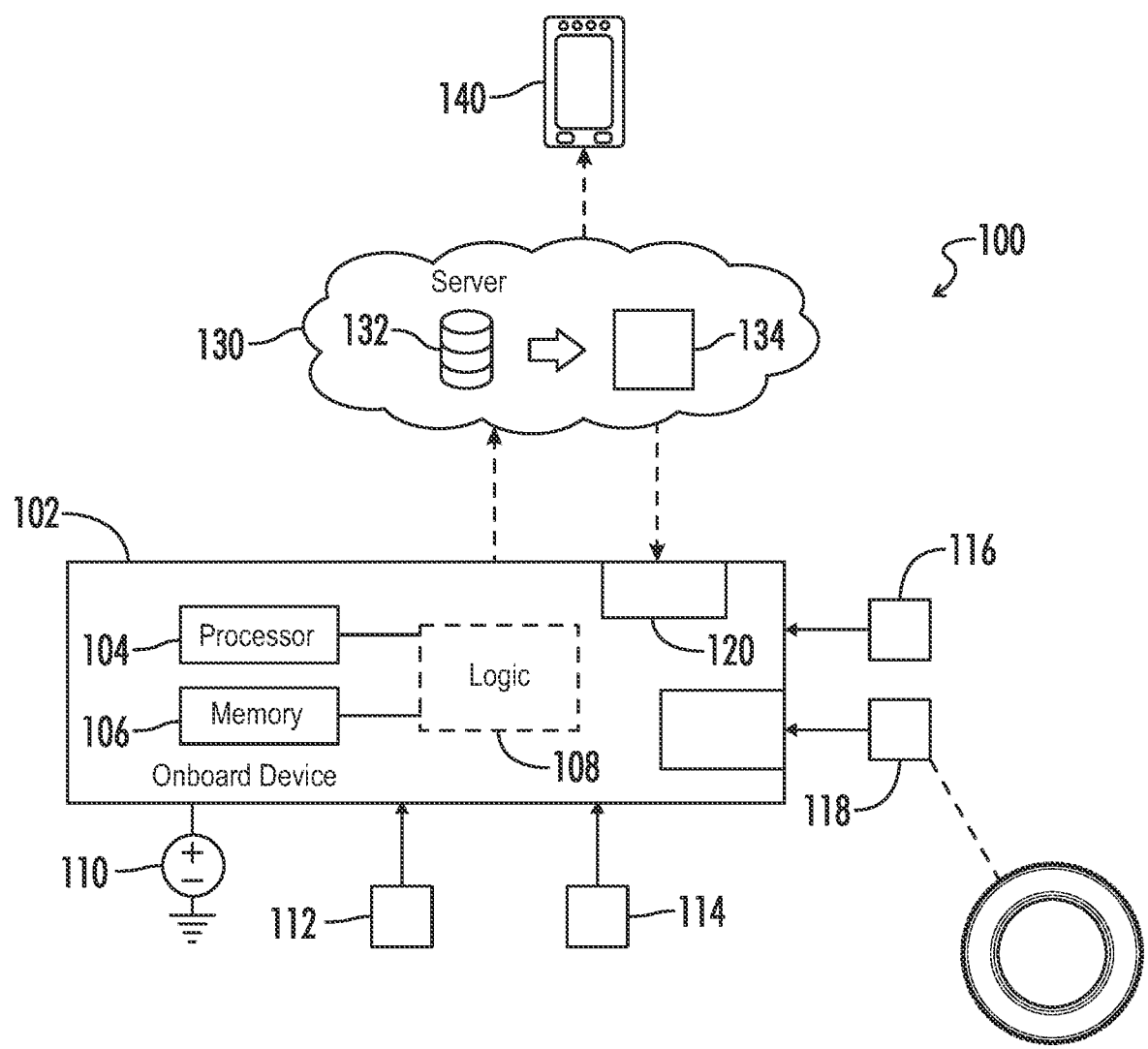
FIG. 1 is a block diagram representing an embodiment of a tire monitoring system as disclosed herein.

Referring generally to FIGS. 1-17c, various exemplary embodiments of an invention may now be described in detail. Where the various figures may describe embodiments sharing various common elements and features with other embodiments, similar elements and features are given the same reference numerals and redundant description thereof may be omitted below.

Various embodiments of a system as disclosed herein may include centralized computing nodes (e.g., a cloud server) in functional communication with a plurality of distributed data collectors and computing nodes (e.g., associated with individual users and/or vehicles) for effectively implementing at least tire wear prediction models as disclosed herein.

Referring initially to FIG. 1, an exemplary embodiment of the system 100 includes a computing device 102 that is onboard a vehicle and configured to at least obtain data and transmit said data to a remote server 130 and/or perform relevant computations as disclosed herein. The computing device may be portable or otherwise modular as part of a distributed vehicle data collection and control system (as shown), or otherwise may be integrally provided with respect to a central vehicle data collection control system (not shown). The device may include a processor 104 and memory 106 having program logic 108 residing thereon. The computing device 102 in various embodiments may be a vehicle electronic control unit (ECU) or a component thereof, or otherwise may be discrete in nature, for example permanently or detachably provided with respect to a vehicle mount.

Generally stated, a system 100 as disclosed herein may implement numerous components distributed across one or more vehicles, for example but not necessarily associated with a fleet management entity, and further a central server 130 or server network in functional communication with each of the vehicles via a communications network. The vehicle components may typically include one or more sensors such as, e.g., vehicle body accelerometers, gyroscopes, inertial measurement units (IMU), position sensors such as global positioning system (GPS) transponders 112, tire pressure monitoring system (TPMS) sensor transmitters 118 and associated onboard receivers, or the like, as linked for example to a controller area network (CAN) bus network and providing signals thereby to local processing units. The illustrated embodiment includes for illustrative purposes, without otherwise limiting the scope of the present invention thereby, an ambient temperature sensor 116, a vehicle speed sensor 114 configured to collect for example acceleration data associated with the vehicle, and a DC power source 110.

One or more of the sensors as disclosed herein may be integrated or otherwise collectively located in a given modular structure as opposed to being discrete and decentralized in structure. For example, a tire-mounted TPMS sensor as referred to herein may be configured to generate output signals corresponding to each of a plurality of tire-specific conditions (e.g., radial acceleration, inflation pressure, contained air temperature). The TPMS sensor may for example be mounted internally in the tire air cavity, slightly elevated and isolated from the metal rim so as not to be adversely influenced thereby.

Various bus interfaces, protocols, and associated networks are well known in the art for the communication between the respective data source and the local computing device, and one of skill in the art would recognize a wide range of such tools and means for implementing the same.

It should be noted that the embodiment represented in FIG. 1 is not limiting on the scope of a system or method as disclosed herein, and that in alternative embodiments one or more of the models 134 may be implemented locally at the onboard computing device 102 (e.g., electronic control unit) rather than at the server level. For example, models 134 may be generated and trained over time at the server level and downloaded to the onboard computing device 102 for local execution of one or more steps or operations as disclosed herein.

In other alternative embodiments, one or more of the various sensors 112, 114, 116, 118 may be configured to communicate with the remote server 130 without the local vehicle-mounted device 102, such as for example via cellular communication networks or via a mobile computing device (not shown) carried by a user of the vehicle.

The system 100 may include additional distributed program logic such as for example residing on a fleet management server or other user computing device 140, or a user interface of a device resident to the vehicle or associated with a driver thereof (not shown) for real-time notifications (e.g., via a visual and/or audio indicator), with the fleet management device in some embodiments being functionally linked to the onboard device 102 via a communications network. System programming information may for example be provided on-board by the driver or from a fleet manager.

The term "user interface" as used herein may, unless otherwise stated, include any input-output module by which a user device facilitates user interaction with respect to a server and/or device as disclosed herein including, but not limited to, downloaded or otherwise resident program applications; web browsers; web portals, such as individual web pages or those collectively defining a hosted website; and the like. A user interface may further be described with respect to a personal mobile computing device in the context of buttons and display portions which may be independently arranged or otherwise interrelated with respect to, for example, a touch screen, and may further include audio and/or visual input/output functionality even without explicit user interactivity.

Vehicle and tire sensors 112, 114, 116, 118 may in an embodiment further be provided with unique identifiers, wherein the onboard device processor 104 can distinguish between signals provided from respective sensors on the same vehicle, and further in certain embodiments wherein a central server 130 and/or fleet maintenance supervisor client device 140 may distinguish between signals provided from tires 101 and associated vehicle and/or tire sensors across a plurality of vehicles. In other words, sensor output values may in various embodiments be associated with a particular tire 101, a particular vehicle, and/or a particular tire-vehicle system for the purposes of onboard or remote/downstream data storage and implementation for calculations as disclosed herein. The onboard device processor 104 may communicate directly with the hosted server 130 as shown in FIG. 1, or alternatively the driver's mobile device or truck-mounted computing device may be configured to receive and process/transmit onboard device output data to the hosted server 130 and/or fleet management server/device 140.

Signals received from a particular vehicle and/or tire sensor 112, 114, 116, 118 may be stored in onboard device memory 106, or an equivalent data storage network functionally linked to the onboard device processor 104, for selective retrieval as needed for calculations according to the method disclosed herein. A "data storage network" as used herein may refer generally to individual, centralized, or distributed logical and/or physical entities configured to store data and enable selective retrieval of data therefrom, and may include for example but without limitation a memory, look-up tables, files, registers, databases, and the like. In some embodiments, raw data signals from the various sensors 112, 114, 116, 118 may be communicated substantially in real time from the vehicle to the server 130. Alternatively, particularly in view of the inherent inefficiencies in continuous data transmission of high frequency data, the data may for example be compiled, encoded, and/or summarized for more efficient (e.g., periodic time-based or alternatively defined event-based) transmission from the vehicle to the remote server 130 via an appropriate (e.g., cellular) communications network.

The vehicle data and/or tire data, once transmitted via a communications network to the hosted server 130, may be stored for example in a database 132 associated therewith. The server 130 may include or otherwise be associated with one or more algorithmic models 134 as disclosed herein for selectively retrieving and processing the vehicle data and/or tire data as appropriate inputs. The models 134 may be implemented at least in part via execution of a processor, enabling selective retrieval of the vehicle data and/or tire data and further in electronic communication for the input of any additional data or algorithms from a database, lookup table, or the like that is stored in association with the server 130.

The system 100 may include additional distributed program logic such as for example residing on a fleet management server or other user computing device 140, or a user interface of a device resident to the vehicle or associated with a driver thereof (not shown) for real-time notifications (e.g., via a visual and/or audio indicator), with the fleet management device 140 in some embodiments being functionally linked to the onboard device 102 via a communications network. System programming information may for example be provided on-board by the driver or from a fleet manager.

Figure 2:
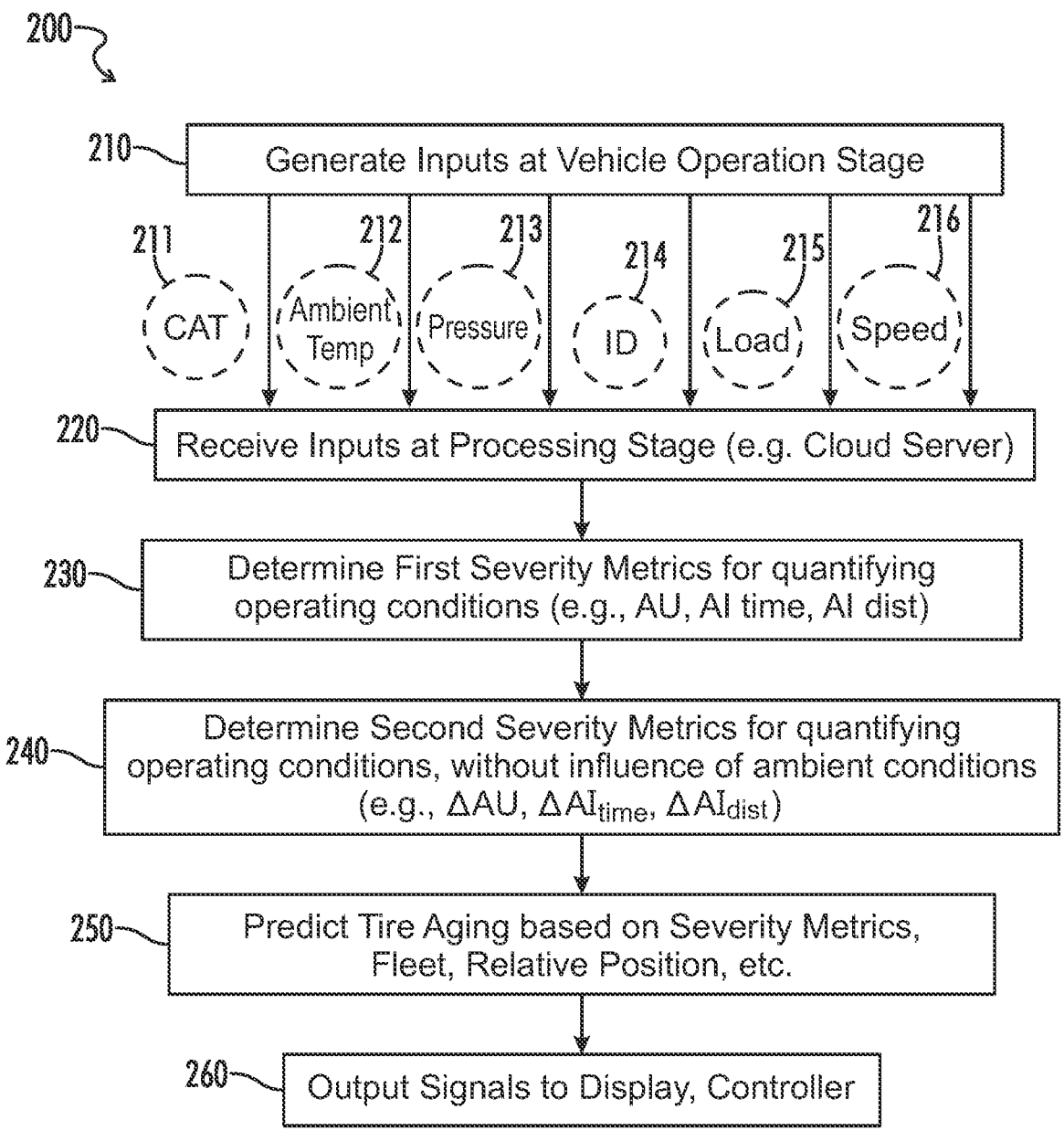
FIG. 2 is a flowchart representing an embodiment of a tire monitoring method as disclosed herein.

An exemplary method 200 as represented in FIG. 2 may now be described for quantifying different performance aspects of a motor vehicle tire, among other functions and advantages thereof as further described herein.

The method 200 begins with collected signals at a vehicle operation stage (step 210), which as previously noted may implement conventional data acquisition devices, such as tire pressure monitoring systems (TPMS) mounted in or on the tire, which generate signals corresponding to contained air temperature 211, ambient temperature 212, inflation pressure 213, tire identifier 214, vertical load 215, speed 216, and the like. The data acquisition device may continuously collect data as the tire is rolling on different roads and surfaces.

The collected signals 211-216 from the data acquisition device may be received and processed locally, for example at an electronic control unit 102 residing on the vehicle, or remotely at for example a cloud server node 130 (step 220). The system may further have previously stored, or otherwise made accessible, information corresponding to each of a plurality of tires of similar type to, and even including, the tire at issue.

The method 200 further includes steps of determining first severity metrics for quantifying operating conditions (step 230), such as relating to each of contained air temperatures and ambient temperatures, and/or determining second severity metrics for quantifying operating conditions (step 240) which remove or otherwise substitute the measured ambient temperatures for a defined reference temperature. Conventional contained air temperature (CAT) distributions are not severity metrics within the scope of the aforementioned first or second sets. Even though informative, such distributions are difficult to use for comparisons and, e.g., do not emphasize that shorter times at higher temperatures can be more detrimental than longer times at lower temperatures.

An exemplary first severity metric as disclosed herein may include an Aging Unit (AU) as an accumulating aging metric. Each AU may for example be the equivalent of the amount of oxidative aging that would occur in the tires of a vehicle parked in a 70-degree Fahrenheit garage for one month. Such a metric may be accumulated throughout the life of the tire for quantifying the actual, cumulative aging that a tire has experienced. Even when the vehicle is parked, the AU may be understood to continue increasing, albeit at a relatively slow rate.

An exemplary second severity metric as disclosed herein may include a Delta Aging Unit ($\Delta AU$), which is similar to AU except the effects of the ambient temperature are effectively removed from the calculation. It may for example be desirable to provide comparisons of tires or fleets that operate in different geographic regions or during different seasons. By separating the effects of the actual ambient temperature from the CAT on a minute-by-minute basis and replacing it with a fixed reference (e.g., 70-degree Fahrenheit), it becomes possible to separate the effects of the operating conditions (load, speed, inflation) from the environmental conditions.

Additional and related severity metrics may include an Aging Index (AI or $\Delta AI$) as a single value that represents the severity of field operating tire temperatures when indexed to time or distance. It may for example be desirable to provide comparisons of tires or fleets over different time periods or mileage traveled. For example, an $AI_{time}$ metric may normalize the accumulated AU's on a per month basis, and an $AI_{dist}$ metric may normalize the AU's on a per-10,000 mile basis.

The Aging Units may be based on the Arrhenius Equation, which estimates the chemical reaction rates in a polymer as the temperature increases, or more specifically the rate oxygen reacts with polymer chains to form cross-links. This rate of reaction approximately doubles with each 10-degree Celsius increase in temperature.

An AU of ten (10) may mean that the operating conditions and ambient temperature conditions have produced contained tire temperatures corresponding with an oxidative aging equivalent to ten months in a 70-degree Fahrenheit garage. If these AU's had accumulated over a two-month period, then the operating and/or environmental conditions associated with the vehicle and/or tire are causing aging to occur five times faster than if left parked ($AI_{time}=5$).

Ambient air consists of about 21% oxygen and passes from a tire cavity through the casing since the cavity is at a higher pressure than the surrounding atmosphere. As oxygen passes through the tire, its natural tendency is to combine or form cross-links with polymer chains. This results in an increase in stiffness, loss of elasticity and increase in the potential for formation of internal fatigue cracks.

One rationale behind using an Arrhenius-based index to express tire degradation in field usage may be rooted in the fact that chemical reaction rates approximately double with each 10-degree Celsius increase in temperature, depending on activation energy. The conventional Arrhenius Equation is as follows:

$$k = Ae^{-Ea/RT}$$

where k is a rate constant, A is a frequency factor or pre-exponential factor, Ea is the activation energy (in joules/mole), R is the ideal gas constant (8.3145 joules/degree Kelvin/mole), and T is temperature (in degrees Kelvin).

In an embodiment, the Aging Unit may be calculated as follows:

$$\frac{\int_{t_0}^{t_1} e^{-\frac{11594K}{T(t)}} dt}{\int_{t_0}^{t_1} e^{-\frac{11594K}{(21.1^\infty + 273.15K)}} dt} \times 100$$

More practically, if t is in minutes and our reference time is one month (43,834 minutes), the Aging Unit may be:

$$= \frac{\sum_{t_0}^{t_1}\left(e^{-\frac{11594K}{T(t)}}\Delta t\right)}{7737 \times 10^{-18}(43834)} = \frac{\sum_{t_0}^{t_1}\left(e^{-\frac{11594K}{T(t)}}\Delta t\right)}{3391 \times 10^{-13}}$$

The temperature function, T(t), in this case is the measured contained air temperature (CAT) as collected for example from the TPMS sensor. Some internal locations within the tire will be at hotter temperatures and some lower, and therefore would age faster or slower, respectively. The CAT is an "average" temperature, which may be considered a strong function of various operating conditions (e.g., load, inflation pressure, speed, miles driven vs. parked) and/or certain environmental conditions (e.g., ambient temperature, pavement temperature, sun load) as well as a weaker function of the heat generation tendency of the tire itself.

Integration of the Arrhenius reaction rate, k, may be performed on a minute-by-minute basis over the time range of interest. Complications may however arise when there is missing data or gaps in the data due to low signal strength of the TPMS sensors, excessive interference between the tire and the receiver, or other instrumentation problems. If data gaps are less than sixty minutes, then a linear interpolation of the missing temperatures is performed and the integration continues, as for example both ambient and CAT are relatively slow changing values and within limits, wherein the interpolation is better than no data. If the data gap is greater than sixty minutes, the integration is stopped and performed in parts with the total time and mileage adjusted accordingly.

A data quality index may be defined in terms of what percentage of the total time period has been removed due to gaps. If for example the gap index becomes more than twenty percent, it may begin to affect the quality of the calculated aging metrics.

In order to calculate the Delta Aging Index (exemplary second severity metric, above), the ambient temperature may for example be subtracted from the contained air temperature on a measurement by measurement basis, with a predetermined reference ambient temperature value (e.g., 70 degrees Fahrenheit) being added. Experimental data suggests that there is not a 1-to-1 relationship between ambient temperature and contained air temperature, and further indicate that a 1° increase in ambient temperature may lead to an approximately 0.80° to 0.83° increase in contained air temperature. Accordingly, for the purposes of the Delta Aging Index, an example calculation may be as follows:

$$\Delta CAT = CAT - (0.80 * T_{amb})$$

where $\Delta CAT$ is the normalized contained air temperature in ° F., CAT is the measured contained air temperature in ° F., and $T_{amb}$ is the measured ambient temperature in ° F. This empirical relationship is exemplary in nature and is not intended as being an exclusive representation but is based on steady state data and appears to be quite accurate in the operating range of field conditions. When the tire is in a transient condition (e.g., either heating or cooling, or parked) this relationship it not presumed to be as accurate.

FIGS. 3-17c provide illustrative support and further examples regarding at least the above-referenced calculations.

Figure 3:
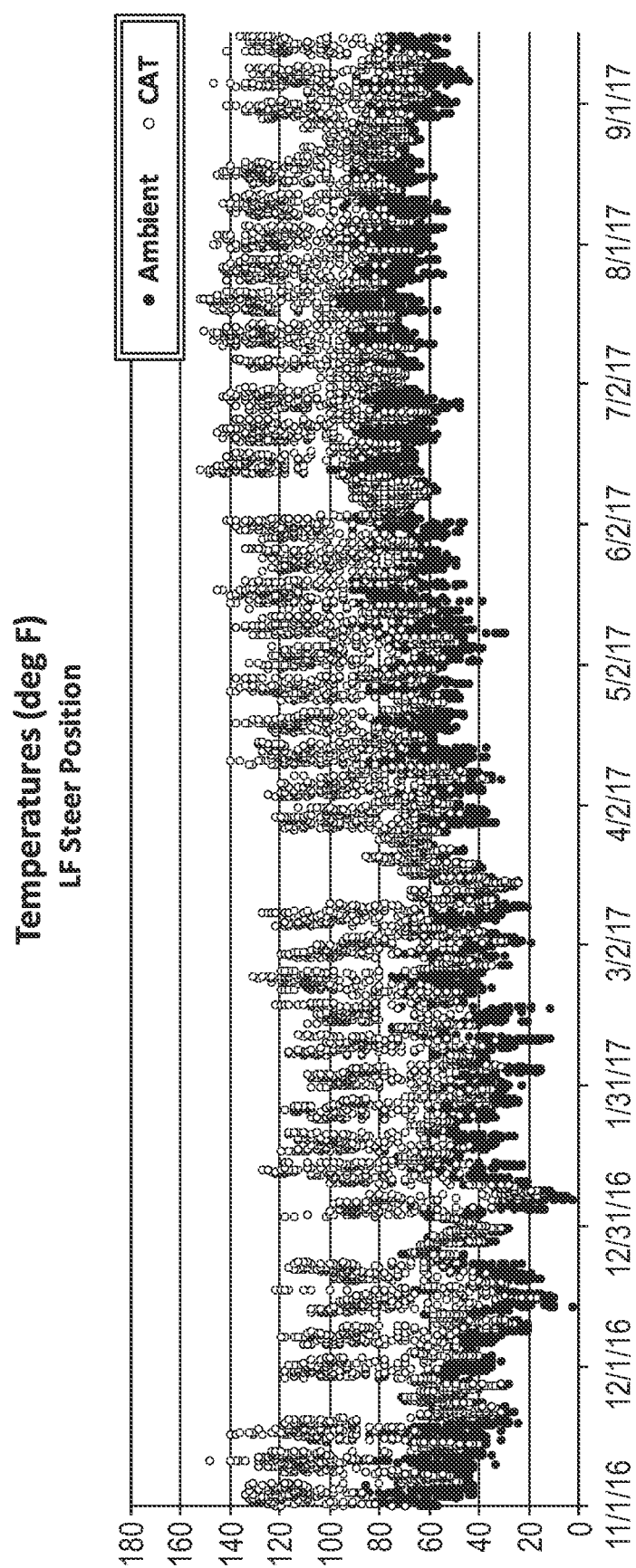
FIG. 3 is a graphical diagram representing exemplary ambient temperatures and tire contained air temperatures as inputs to a tire aging model as disclosed herein.

Referring to FIG. 3, exemplary ambient temperatures and tire contained air temperatures are represented as basic inputs to a tire aging model as disclosed herein. The represented temperatures are in degrees Fahrenheit, taken with respect to a left-front wheel position with a gap index of one percent.

Figure 4:
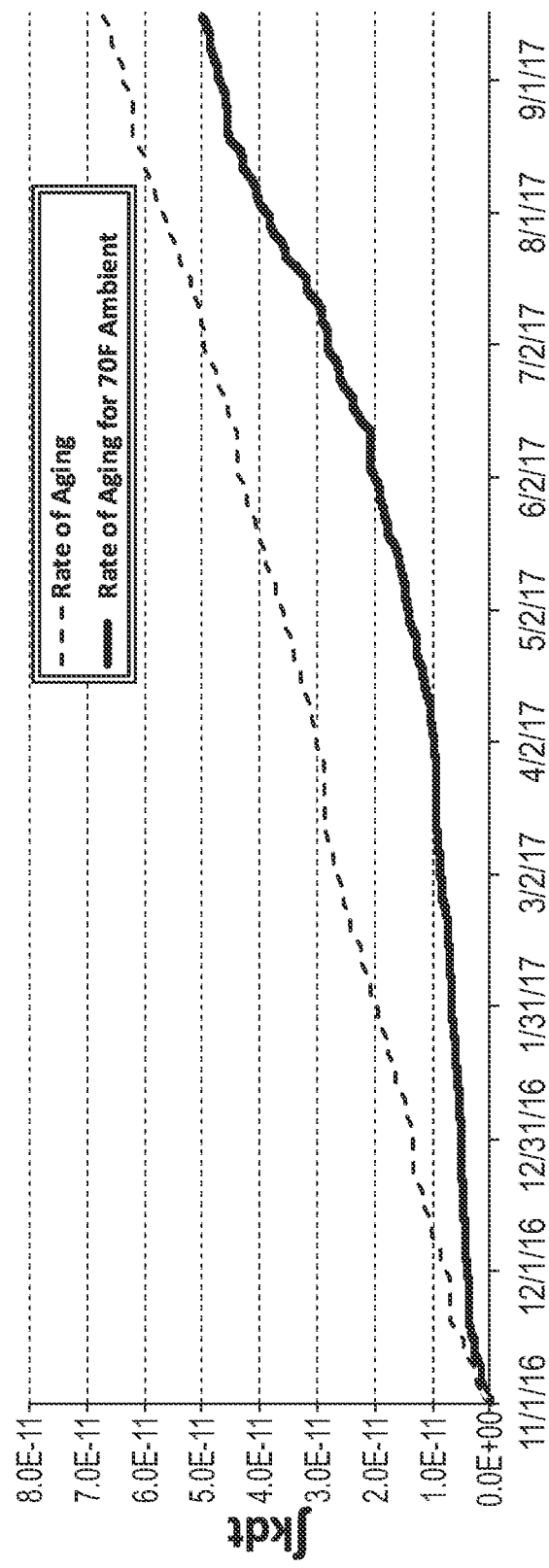
FIG. 4 is a graphical diagram representing Arrhenius reaction rate integrals over a 319-day period for contained air temperatures of a left-front tire of an exemplary motor vehicle.

As represented in FIG. 4, the Arrhenius rate constant k is integrated over a 319-day period for the measured CAT's of the same tire of the vehicle represented in FIG. 3. The lower line is the actual rate of aging, indicating slower accumulation in the winter months, and higher accumulation in the summer months. The upper line has the ambient temperature replaced with a reference temperature, i.e., a constant 70-degree Fahrenheit ambient temperature.

Figure 5:
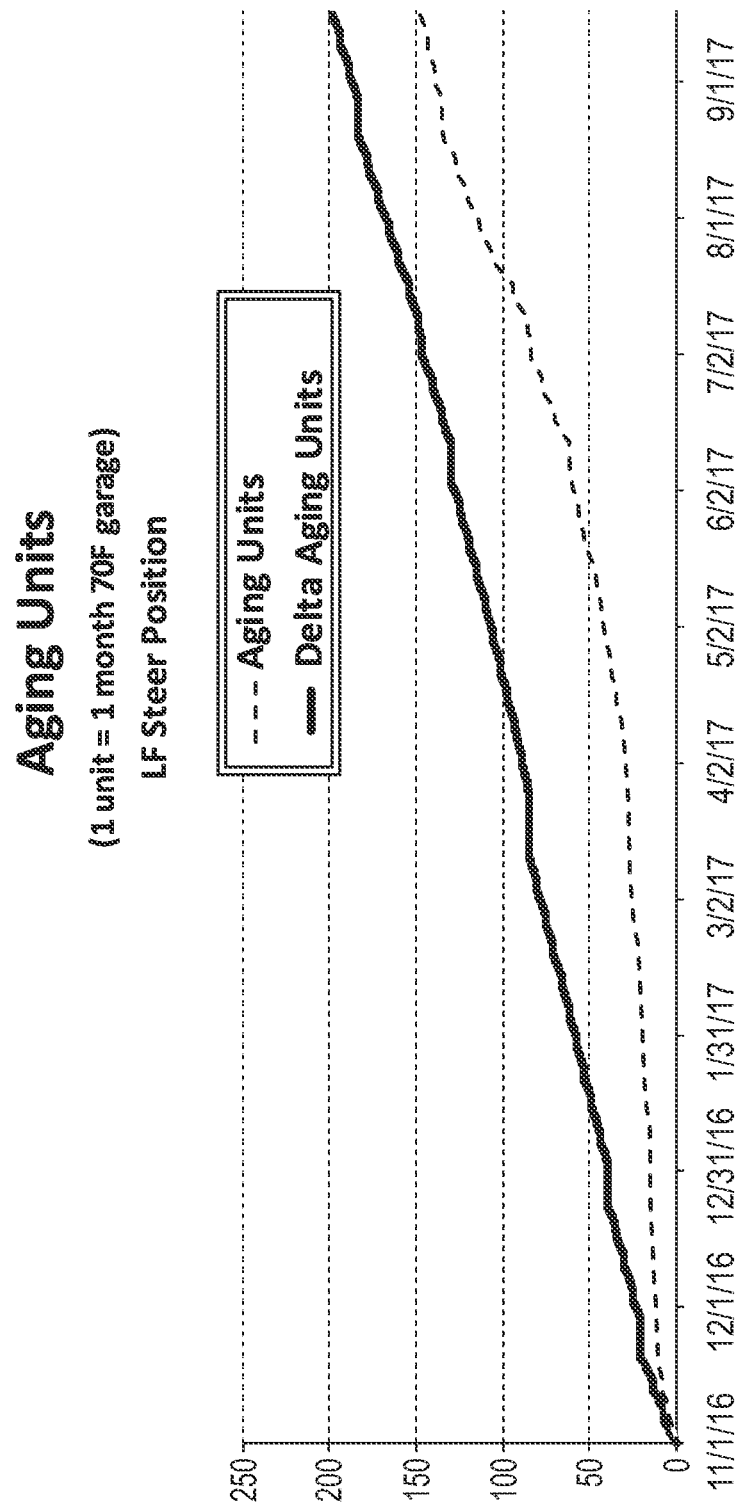
FIG. 5 is a graphical diagram representing exemplary Aging Units as derived from the integrals in FIG. 4.

As represented in FIG. 5, Aging Units (AU's) are defined with respect to the vehicle from FIGS. 3 and 4 by dividing the two integrals from FIG. 4 by the reaction rate k for one month at 70° F. The upper line ($\Delta AU$'s) accumulates more than the lower line (AU's) since the ambient temperature is generally less than 70° F. even though the slope of the lower line is greater in the summer months. In the example shown, the left-front tire on this vehicle accumulated 148 AU's in its first 319 days of operation. If the vehicle would have been operated in a fixed 70° F. ambient environment, it theoretically would have accumulated 198 $\Delta AU$'s. The $\Delta AU$ values are advantageous if comparing vehicles that have operated in different ambient environments or over different seasons and the purpose is to compare operating conditions, not a mixture of operating and environmental conditions.

Figure 6:
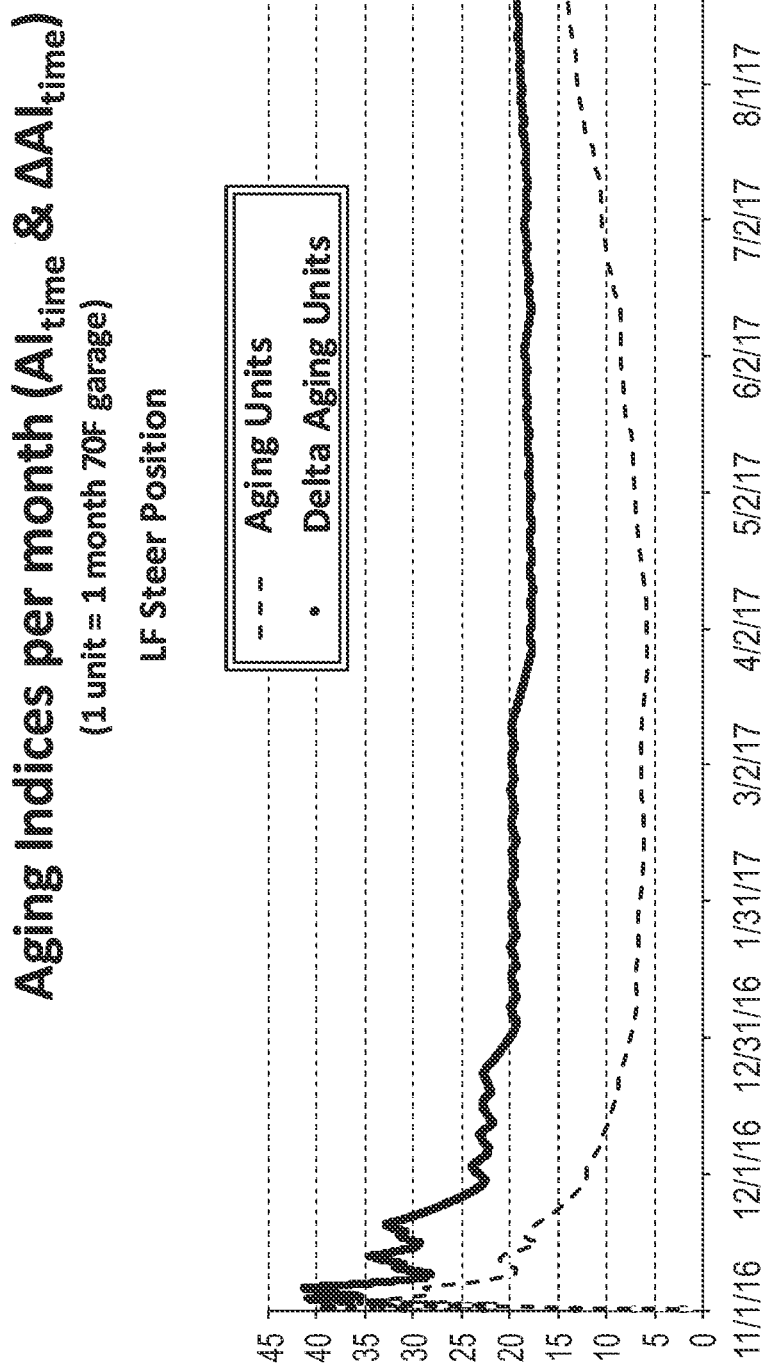
FIG. 6 is a graphical diagram representing the Aging Units of FIG. 5, indexed with respect to time.
Figure 7:
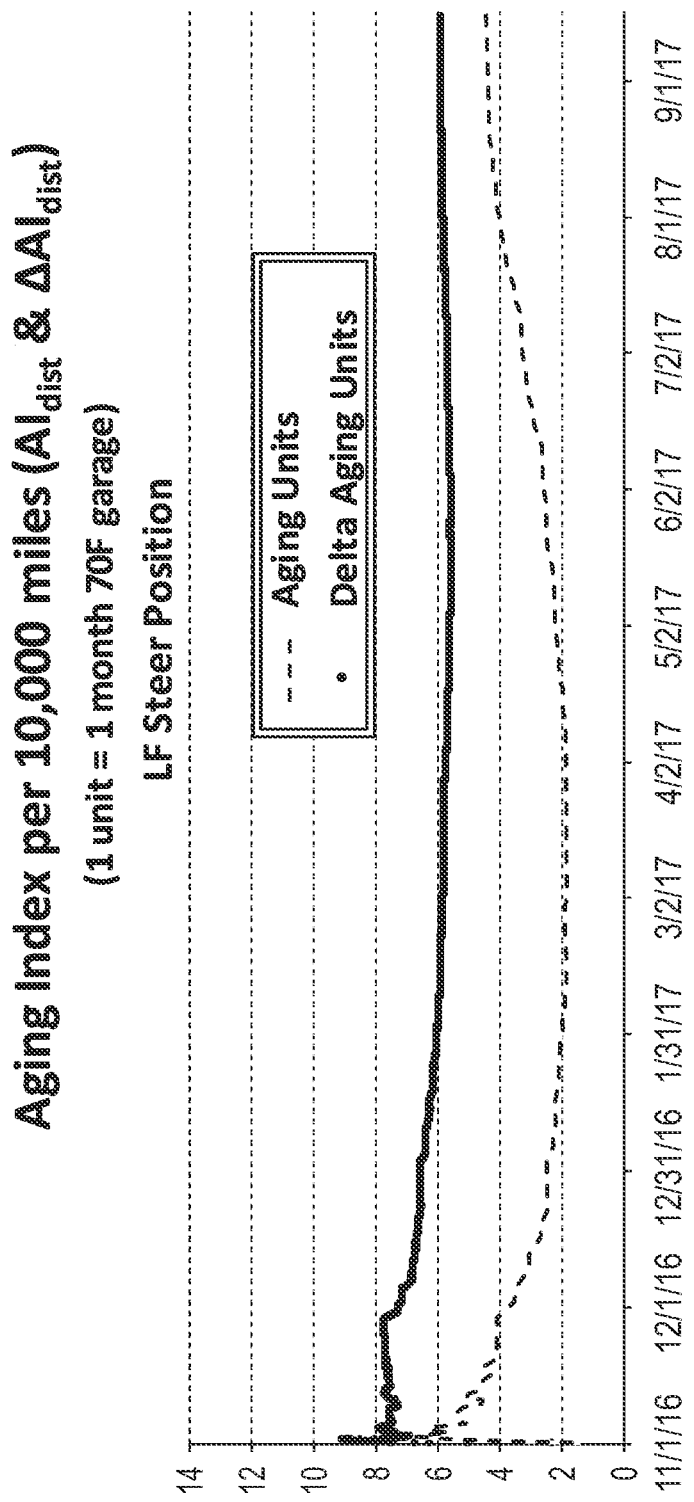
FIG. 7 is a graphical diagram representing the Aging Units of FIG. 5, indexed with respect to distance.
Figure 8A:
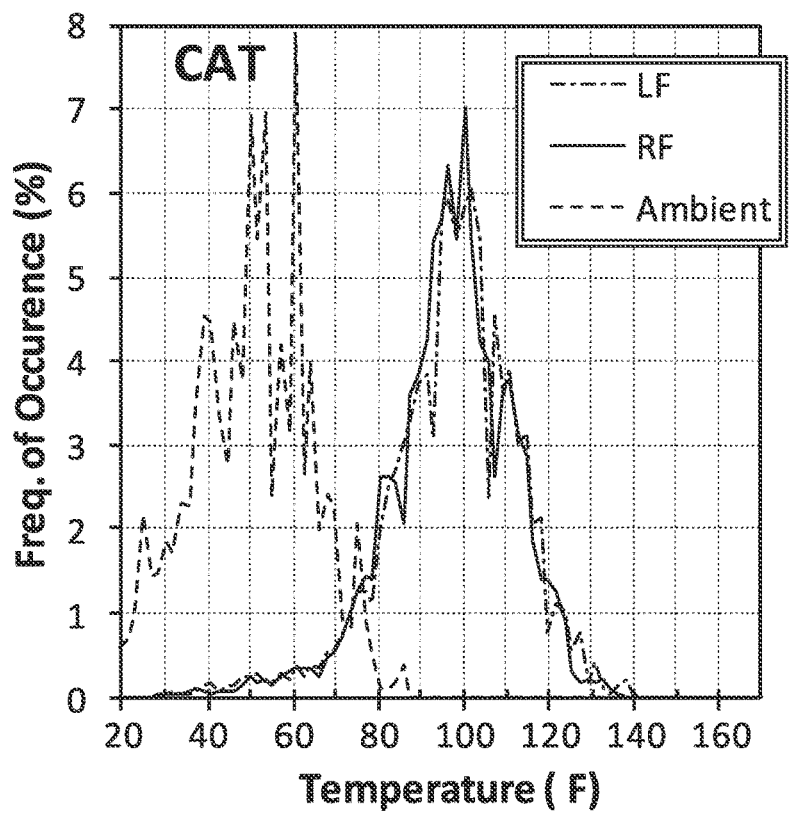
FIGS. 8a to 8e are graphical diagrams representing exemplary ambient and contained air temperature values for respective motor vehicles from different fleets.
Figure 8B:
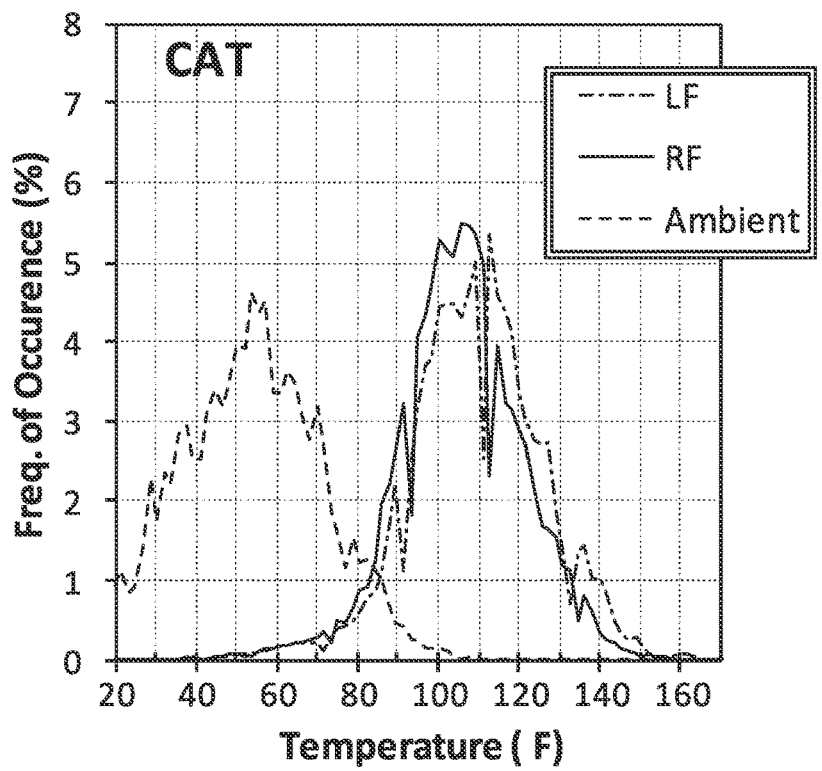
Figure 8C:
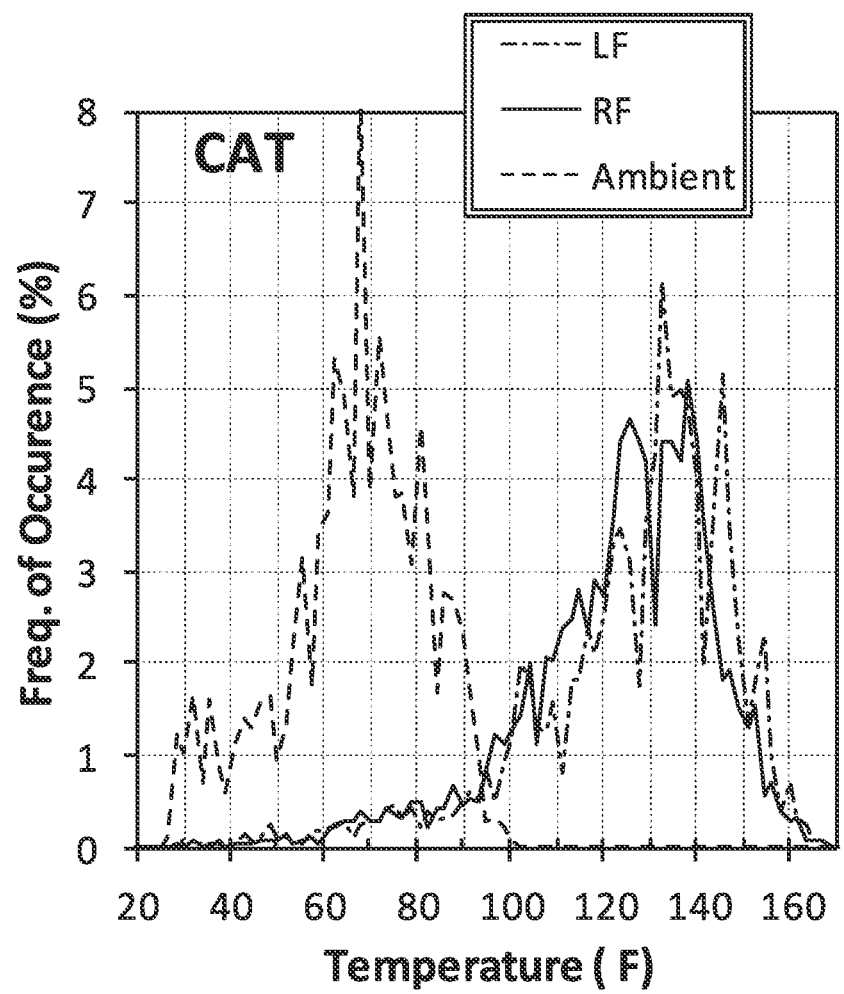
Figure 8D:
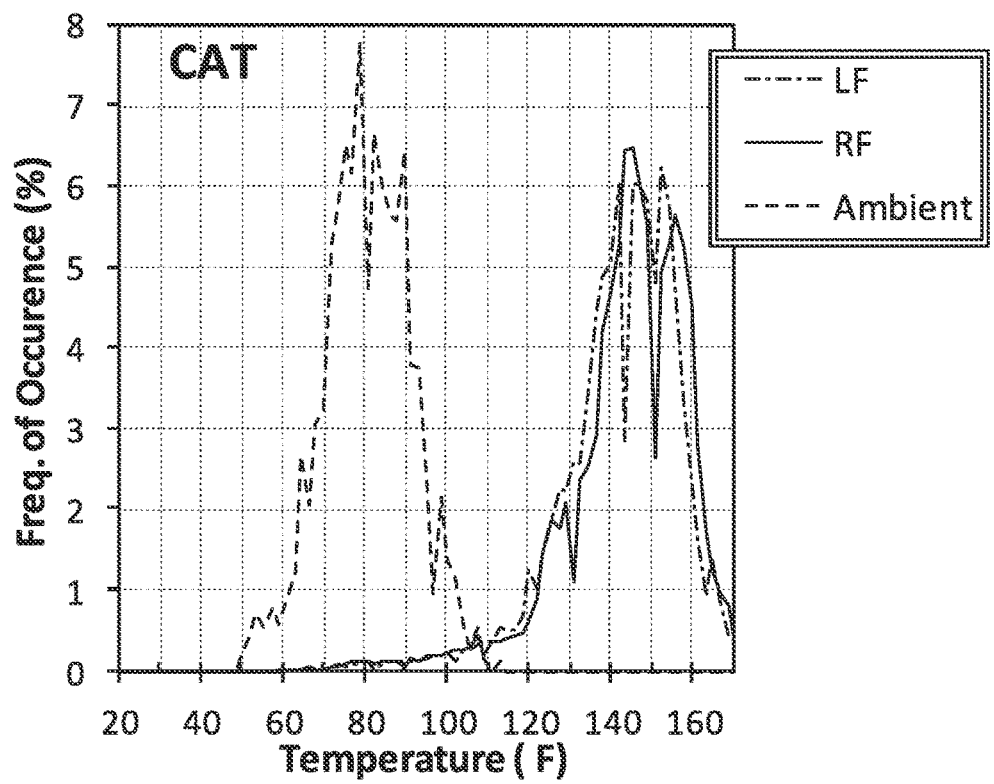
Figure 8E:
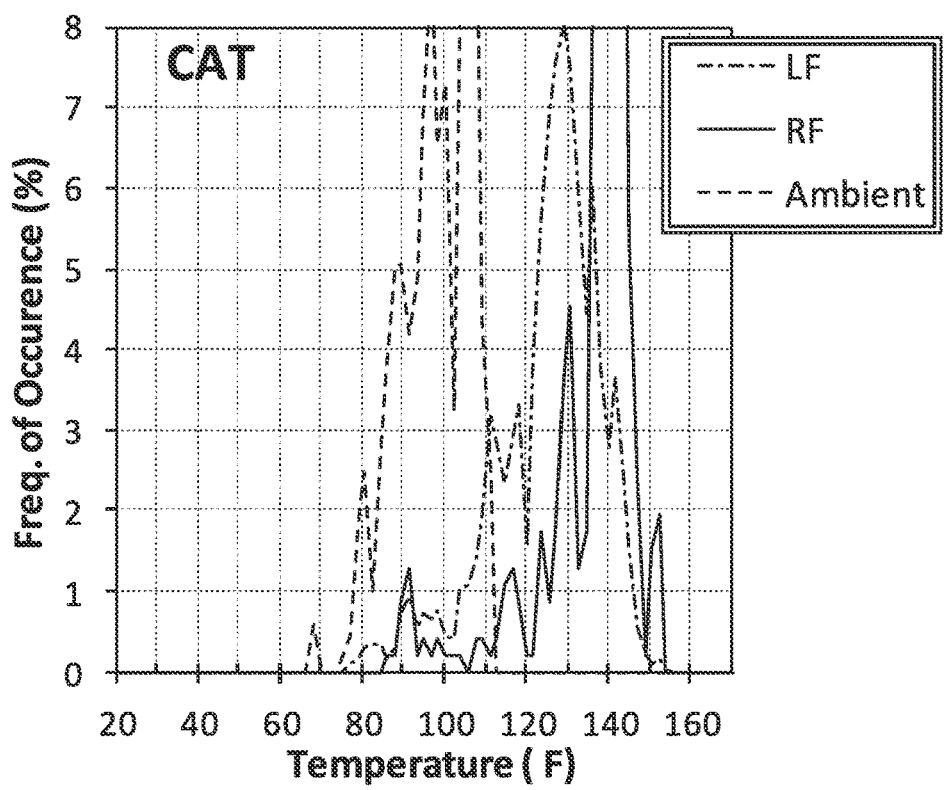

As represented in FIG. 6, still respect to the same exemplary vehicle as in FIGS. 3-5, Aging Units can also be indexed with respect to time (e.g., per month, or 30.44 days). These curves are differentiations of the respective curves in FIG. 5. The same (left-front) tire on this vehicle accumulates approximately 14 AU's per month, the lower curve, but note that it does not level out very quickly. The upper curve levels out more quickly, at 19 AU's per month, because it does not have an ambient environmental influence. $AI_{time}$ or $\Delta AI_{time}$ may be conveniently implemented as metrics when comparing vehicles or tires that have been in use for different lengths of time.

As represented in FIG. 7, again with respect to the same exemplary vehicle and tire as in FIGS. 3-6, the Aging Index as normalized by distance levels off more quickly than when normalized by time. Seasonal effects are evident in the $AI_{dist}$ values but largely cancelled out of the $\Delta AI_{dist}$ values. The represented tire accumulates approximately 7.1 units every 10 k miles driven and 9.5 units per 10 k miles when the ambient temperature is fixed to 70° F.

Figure 9A:
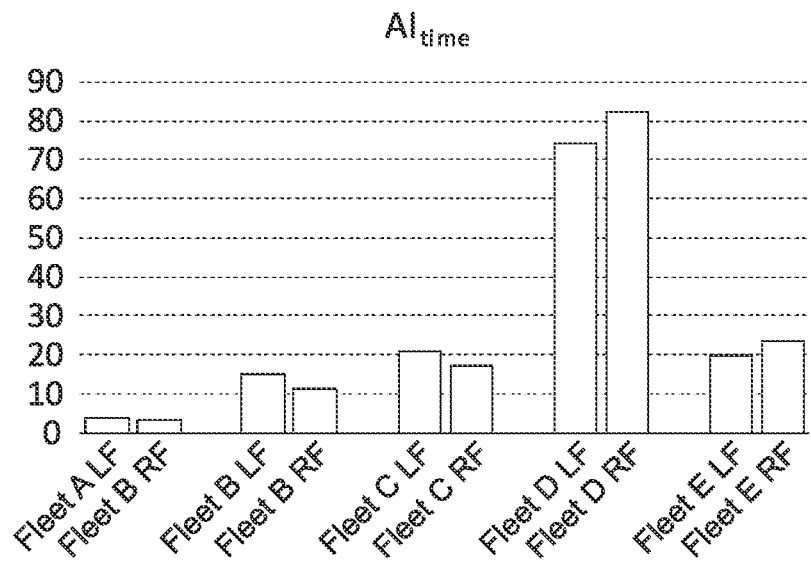
FIGS. 9a and 9b are graphical diagrams representing exemplary Aging Index values for the different fleets, with respect to time and distance, respectively.
Figure 9B:
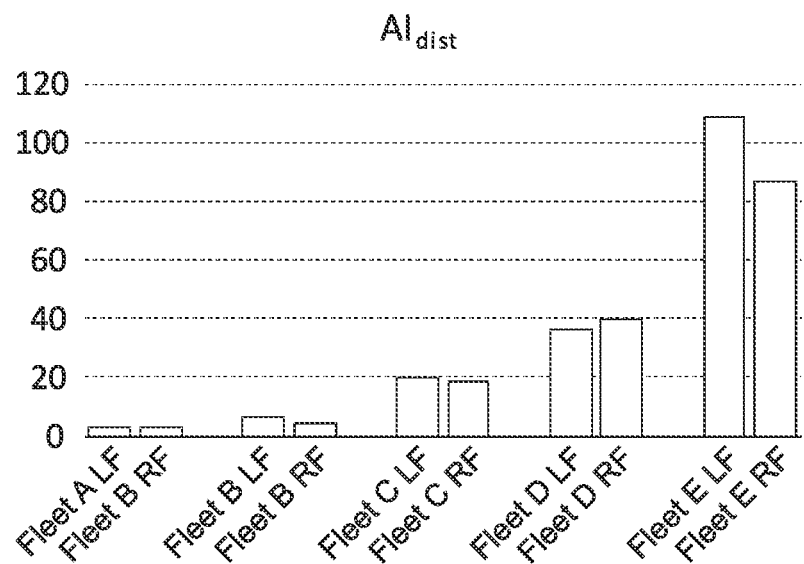
Figure 10A:
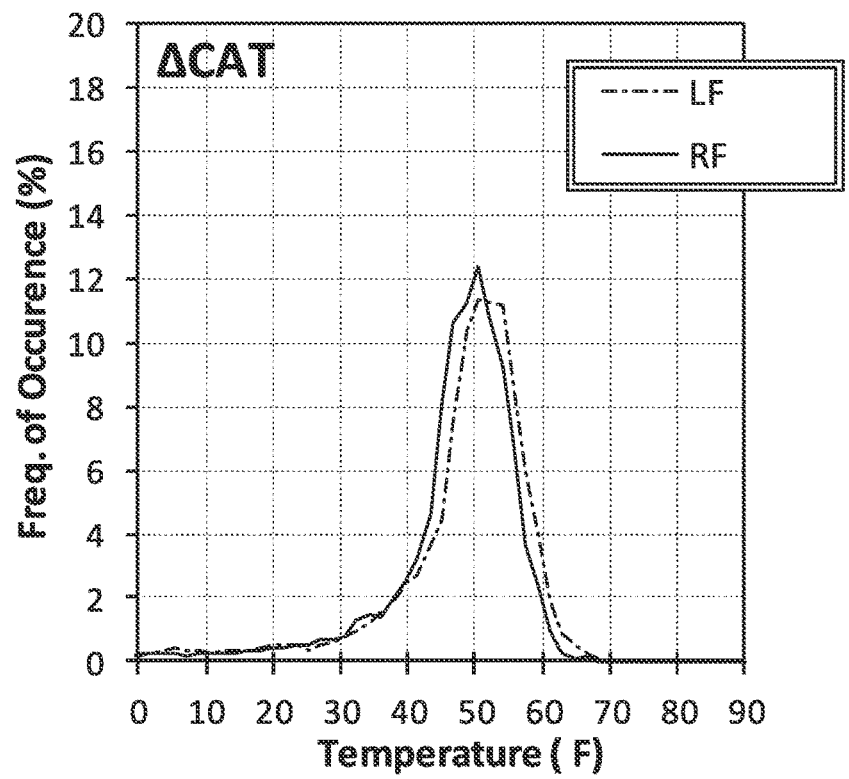
FIGS. 10a to 10e are graphical diagrams representing exemplary Delta contained air temperature (ACAT) values for the respective motor vehicles from FIGS. 8a to 8e.
Figure 10B:
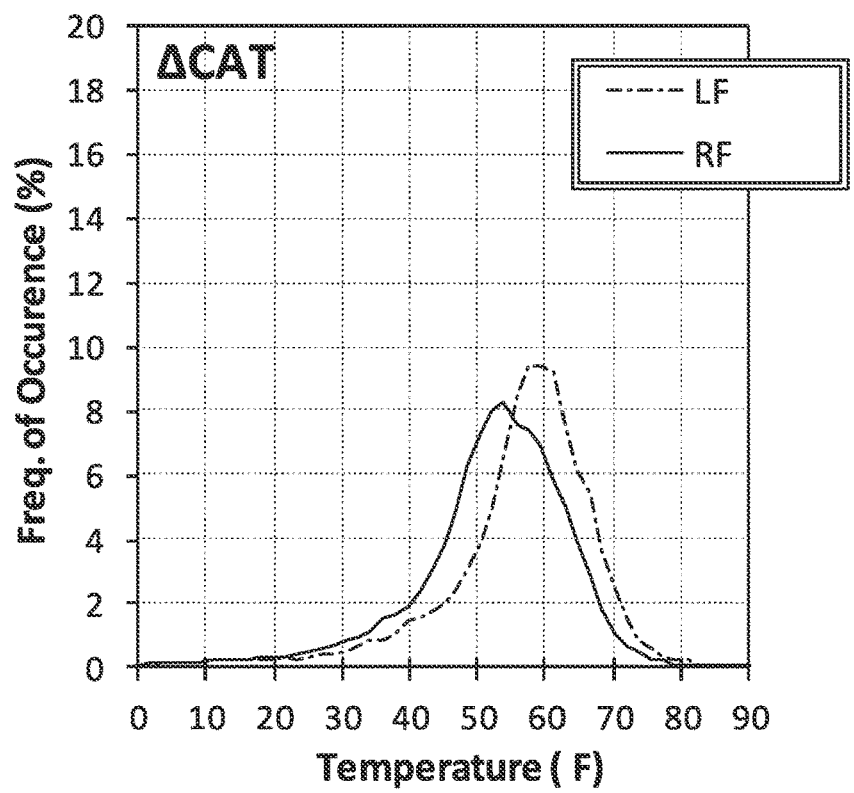
Figure 10C:
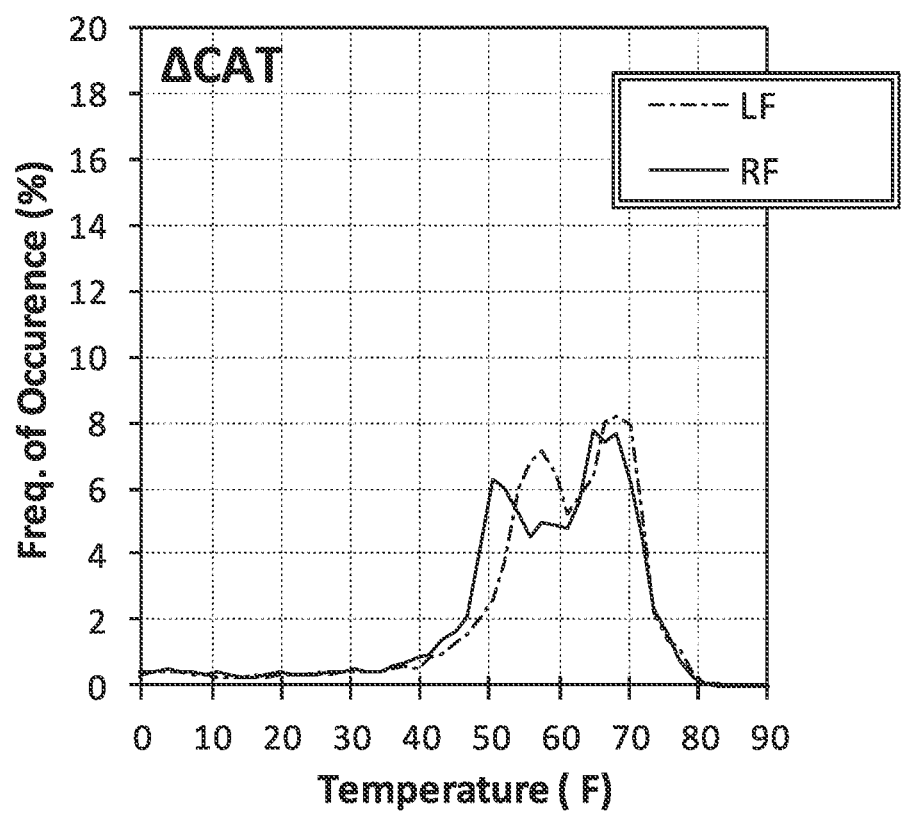
Figure 10D:
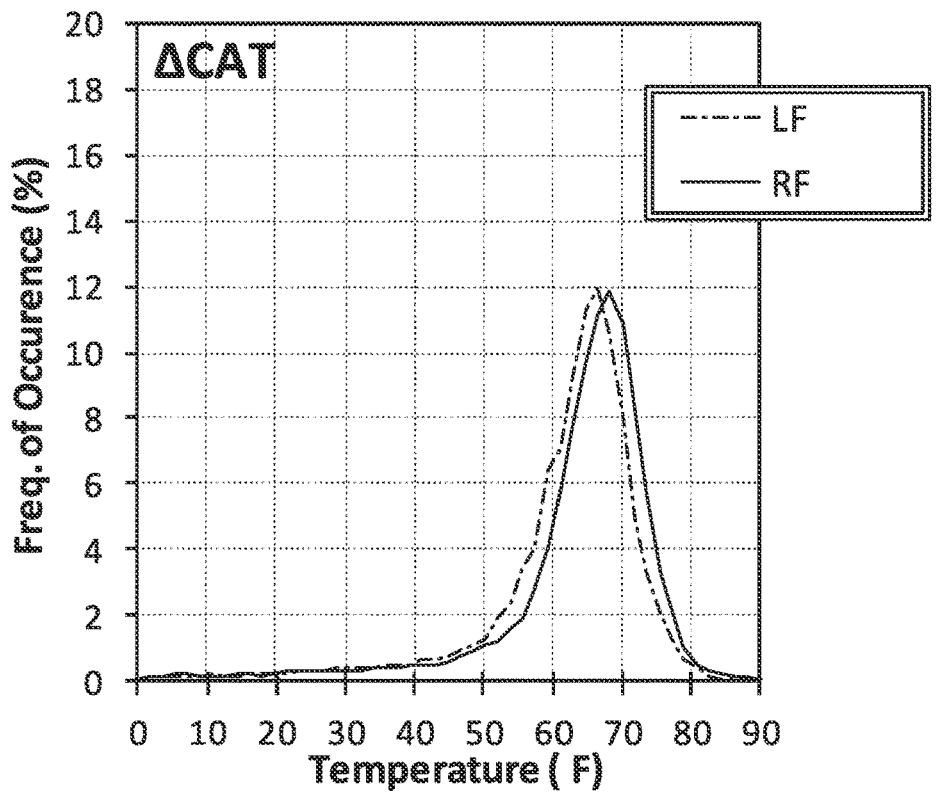
Figure 10E:
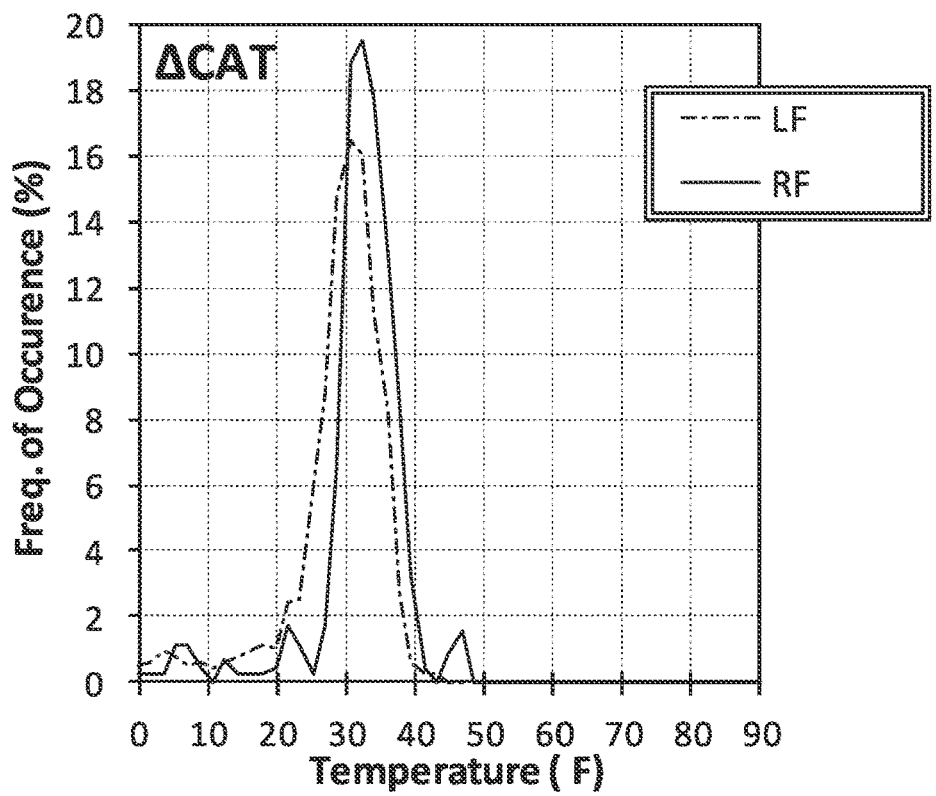

FIGS. 8a-8e are plots of respective steer tire contained air temperature distributions for different fleets with a wide range in applications. For example, annual mileages range from 21 k to 244 k and average ambient temps range from 50 to 98 degrees Fahrenheit. Both Aging Indices for the represented fleets (A to E) in FIGS. 9a and 9b are a strong function of the contained air temperature, but also a function of the ambient temperatures. The Aging Index with respect to time $AI_{time}$ (see FIG. 9a) is also a strong function of miles driven and utilization percent (i.e., time spent in on the road vs. being parked). The Aging Index with respect to distance $AI_{dist}$ (see FIG. 9b) shows Fleet E to be relatively severe based on mileage.

Figure 11A:
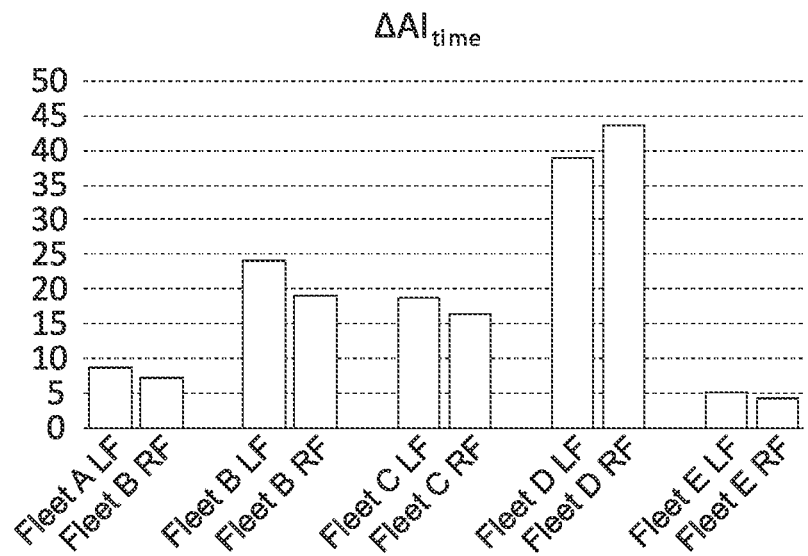
FIGS. 11a and 11b are graphical diagrams representing exemplary Delta Aging Index values for the different fleets, with respect to time ($\Delta AI_{time}$) and distance ($\Delta AI_{dist}$), respectively.
Figure 11B:
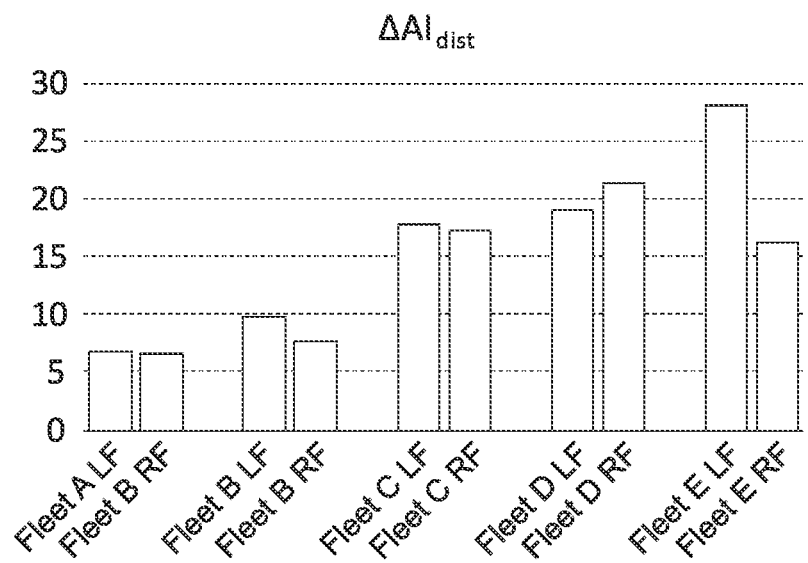

FIGS. 10a-10e are plots of the steer tire $\Delta CAT$ distributions for the same fleets (A to E) represented in FIGS. 8a-8e, respectively. Both Delta Aging Indices for the represented fleets (A to E) in FIGS. 11a and 11b are a strong function of the contained air temperature, but effects of the ambient temperature have been removed. The Delta Aging Index with respect to time $\Delta AI_{time}$ (see FIG. 11a) is also a strong function of miles driven and utilization percent (i.e., time spent in on the road vs. being parked). The Delta Aging Index with respect to distance $\Delta AI_{dist}$ (see FIG. 11b) shows Fleet E to be relatively severe based on mileage.

Figure 12:
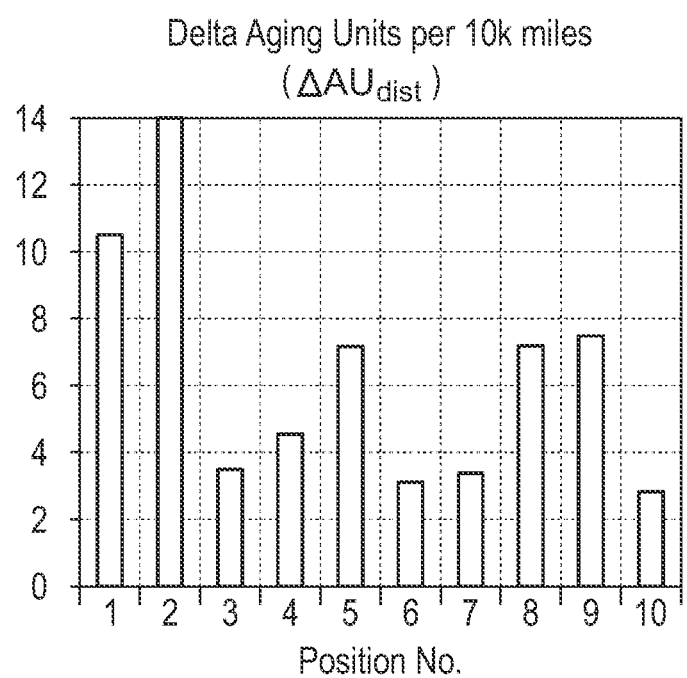
FIG. 12 is a graphical diagram representing exemplary Delta Aging Index values for a particular motor vehicle with respect to distance ($\Delta AI_{dist}$), for different tire positions.

FIG. 12 illustrates a plot of the Delta Aging Unit metric for steer tires (positions 1 and 2) and drive tires (positions 3-10) for an exemplary truck, indexed with respect to distance, $\Delta AU_{dist}$. Plots were captured for various other trucks in the same regional fleet (not shown), with percent utilization varying from as low as 11.5% to as high as 29.3%. Even though there are some distinct differences between the various trucks, the consistencies were noteworthy. For example, the steer tires (positions 1 and 2) were determined to be aging 8-12 AU's per 10 k miles, the steer tires age faster than the drive tires, and inside drive tires (positions 4-5 and 8-9) age faster than the corresponding outside drive tires (positions 3-6 and 7-10).

Figure 13:
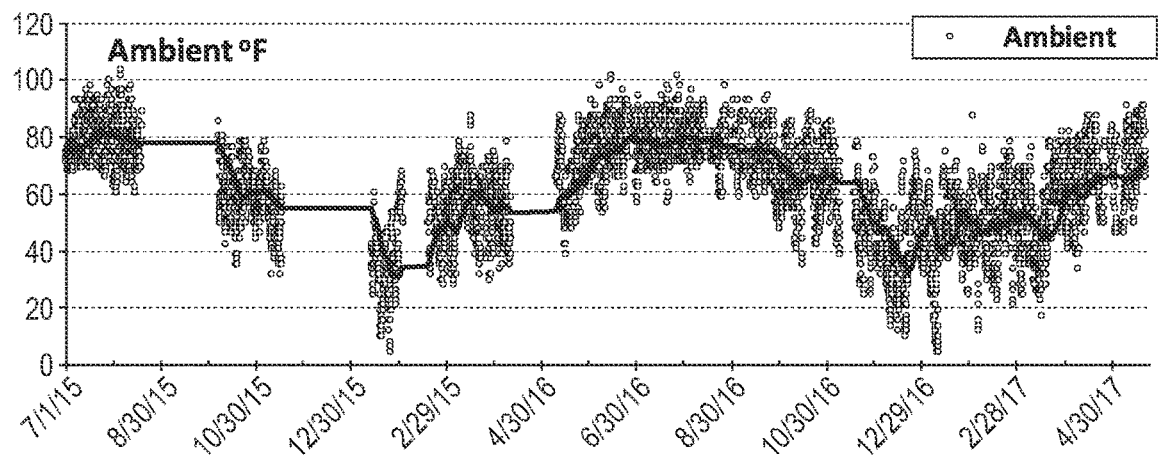
FIG. 13 is a graphical diagram representing exemplary ambient temperature trends associated with a given motor vehicle.
Figure 14:
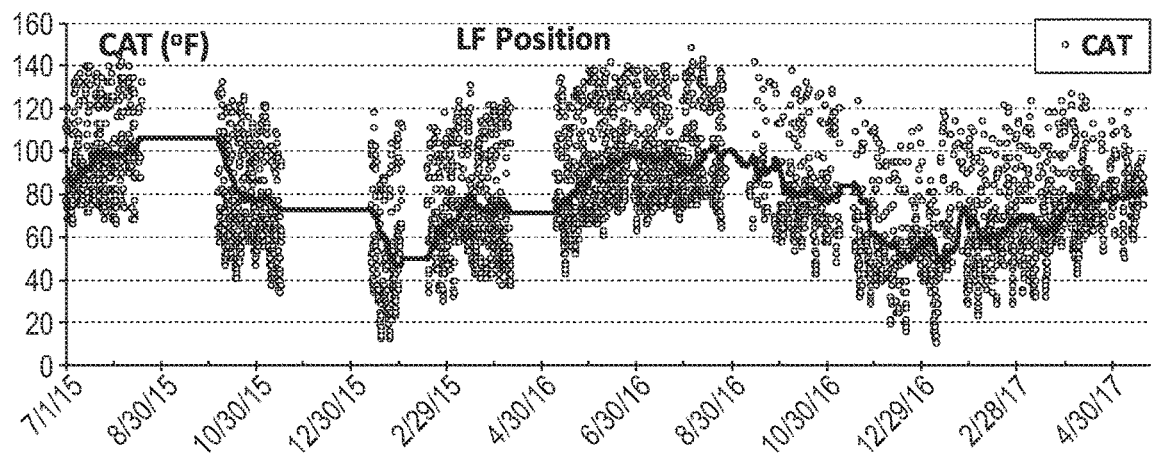
FIG. 14 is a graphical diagram representing exemplary contained air temperature trends for the motor vehicle of FIG. 13.
Figure 15:
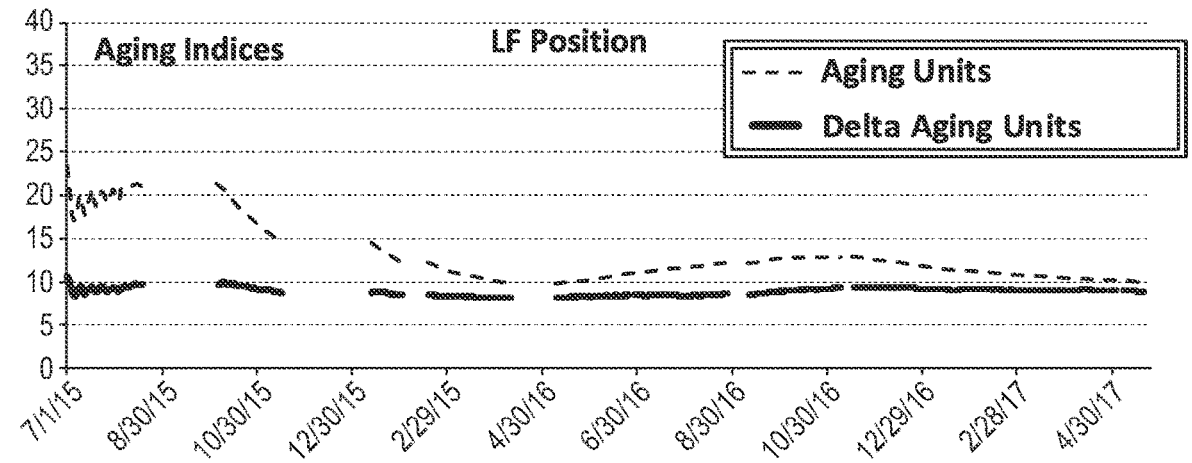
FIG. 15 is a graphical diagram representing exemplary Aging Index and Delta Aging Index values for the motor vehicle of FIGS. 13 and 14 with respect to time ($AI_{time}$ and $\Delta AI_{time}$, respectively).

FIGS. 13-15 relate to exemplary data points and calculations from a common motor vehicle. FIG. 13 represents the results of a 706-day long TPMS data file and demonstrates seasonal trends in the ambient temperature. As further shown in FIG. 14, these ambient trends are also translated into the contained air temperature. The resultant $AI_{time}$ values in the upper plots of FIG. 15 are relatively stabilized after five months even with large data gaps due to equipment malfunction. The resultant $\Delta AI_{time}$ values in the lower plots of FIG. 15 stabilize sooner and do not show the seasonal effects. In this case $AI_{time}$ and $\Delta AI_{time}$ are close in value because the average ambient temperature is relatively close to the 70-degree Fahrenheit reference temperature used to normalize the $\Delta AI_{time}$.

Figure 16A:
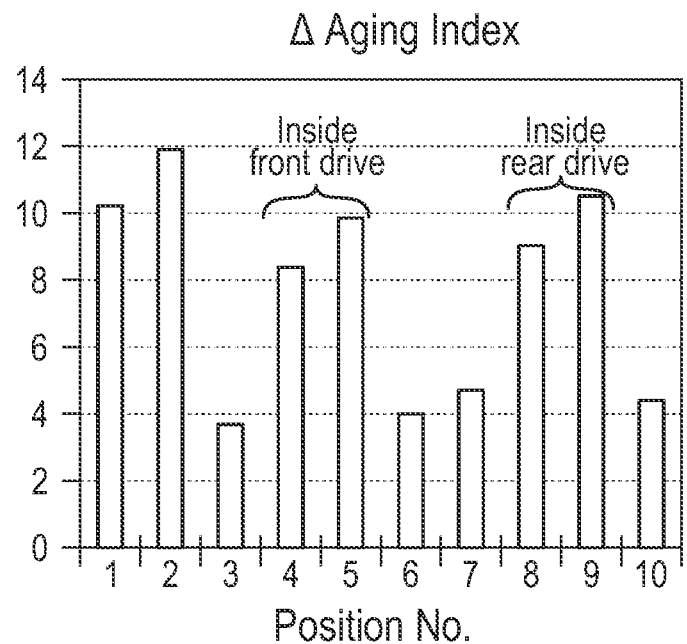
FIGS. 16a to 16d are graphical diagrams representing exemplary values for different motor vehicles, for different tire positions.
Figure 16B:
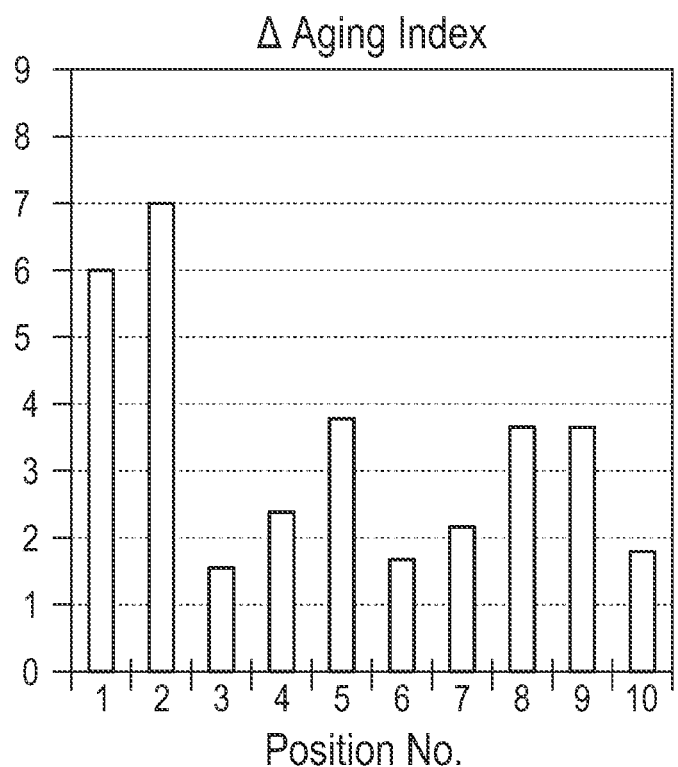
Figure 16C:
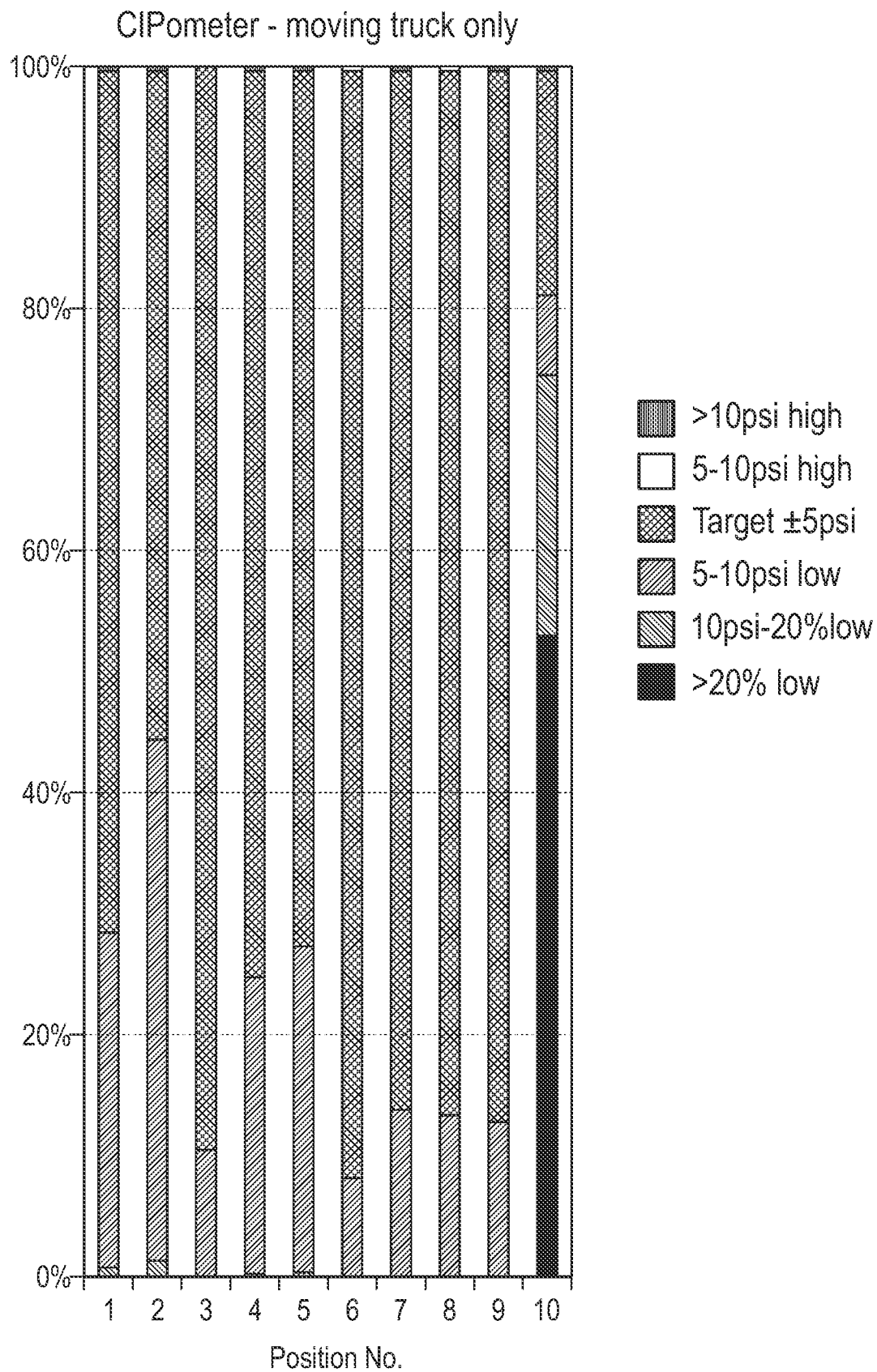

FIGS. 16a and 16c show plots of the Delta Aging Index metric for steer tires (positions 1 and 2) and drive tires (positions 3-10) for two exemplary trucks, indexed with respect to time, $\Delta AI_{time}$. The values show that inside drive tires (positions 4, 5 and 8, 9) are hotter than the corresponding outside drive tires (positions 3, 6 and 7, 10) and that steer tires are hotter than drive tires.

Figure 16D:

FIGS. 16c and 16d show cold inflation pressures (CIPometers) and Delta Aging Indices $\Delta AI_{time}$, respectively, for each tire on an exemplary truck, different from the trucks of FIGS. 16a and 16b. The tire at position 10 has been extremely underinflated about half of the time, as a result of which its sister tire (position 9), which is properly inflated, runs hotter than would otherwise be the case and accordingly has a relatively high Delta Aging Index $\Delta AI_{time}$ as shown in FIG. 16d.

Figure 17A:
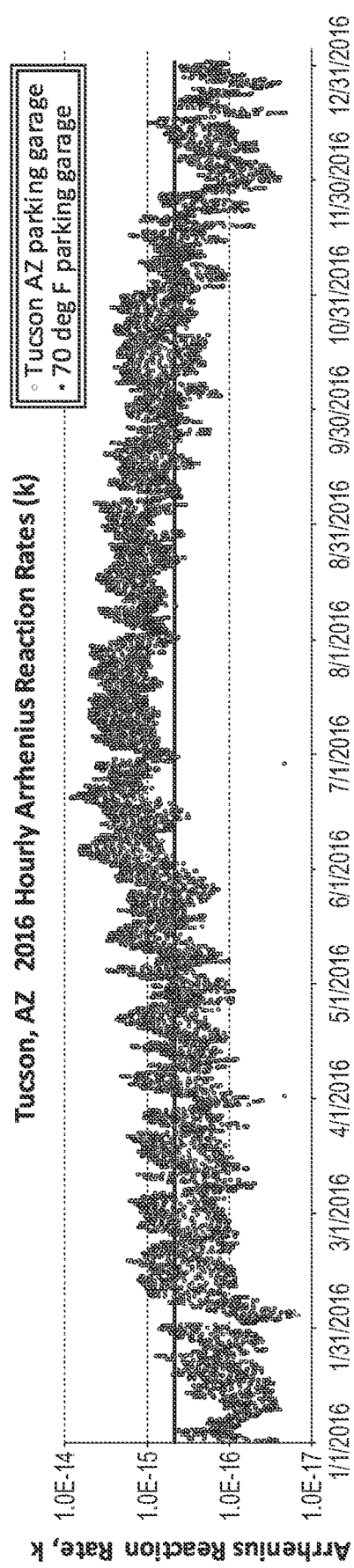
FIGS. 17a to 17c are graphical diagrams representing exemplary ambient temperatures, Arrhenius reaction rates, and Aging Index values, respectively, for a given period of time in Tucson, AZ.

As represented in FIG. 17a, the Aging Index can also be used to determine the effects of the annual ambient temperature measurements for different locations on tire aging. The illustrated plot shows exemplary hour by hour ambient temperature measurements for a specific location (Tucson, AZ). The influence of ambient temperature is already included in the Aging Index since it has a large influence on the contained air temperature. It may be noted that the difference between the lower range of ambient temperatures to the upper range of ambient temperatures is about a factor of 2.5. However, it may be noted that when the hourly ambient temperature measurements are then be fed into the Arrhenius equation, the difference between the lower values to the higher values of the corresponding reaction rate is about two orders of magnitude, representing the non-linear effect that temperature has on reaction rate.

Figure 17B:
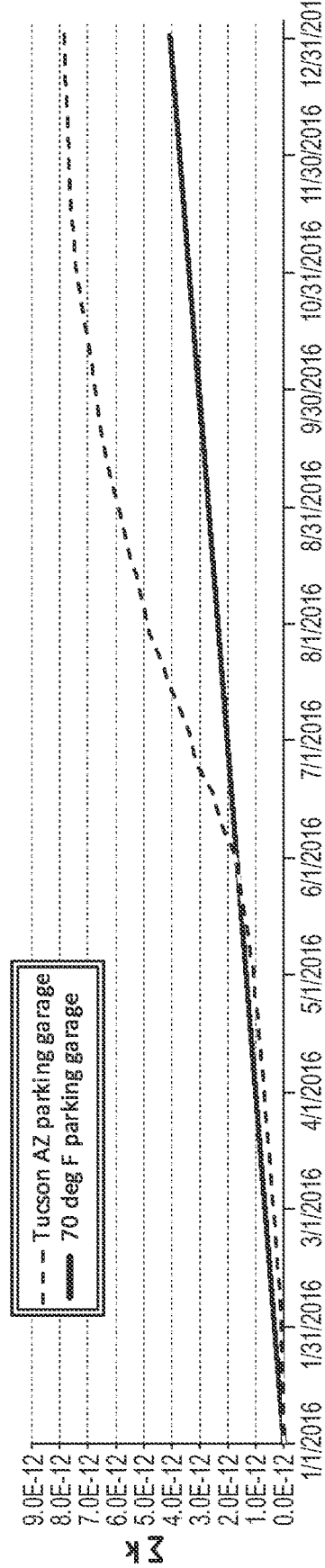

Further represented in FIG. 17b are summations of the reaction rates for the values in FIG. 17a, across the same exemplary range of time starting at the beginning of the year through the end of the year. The variable curve represents the Tucson ambient temperature distribution, whereas the linear curve represents the predetermined fixed reference ambient (i.e., 70° F.) temperature used as an index.

Figure 17C:
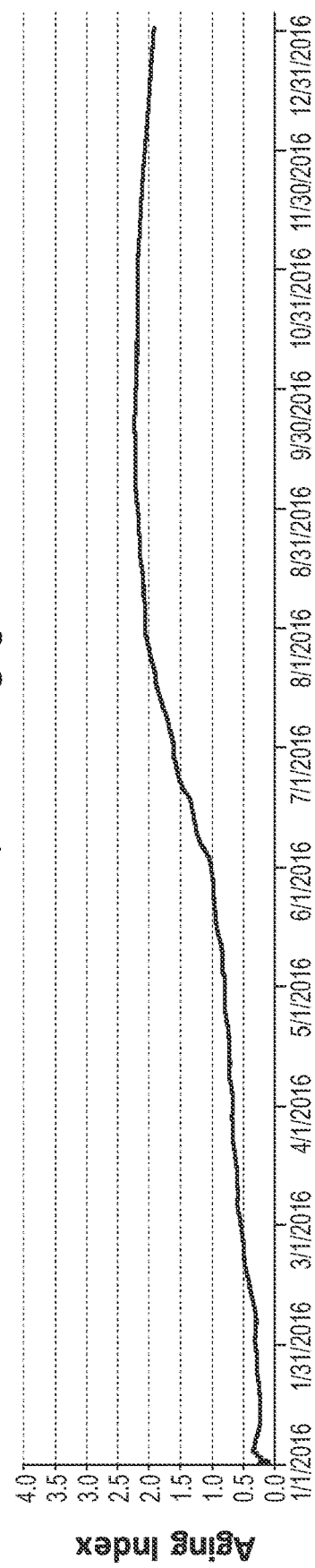

FIG. 17c shows the Aging Index as the ratio of the two curves in FIG. 17b. One of skill in the art may conclude that the representative ambient temperatures from 2016 in Tucson would age a tire 1.93× faster than if the same tire was sitting in a controlled environment (e.g., 70° F. room).

In some embodiments, the method 200 may also involve providing one or more of the severity metrics, alone or in combination with other relevant data, as inputs to a model for predicting tire aging or wear state at one or more future points in time (step 250). For example, a feedback signal (step 260) corresponding to the predicted tire aging status may be provided via an interface to an onboard device 102 associated with the vehicle itself, or to a mobile device associated with a user, such as for example integrating with a user interface configured to provide alerts or notice/recommendations of an intervention event, such as for example that one or more tires should or soon will need to be replaced, rotated, aligned, inflated, and the like.

Inputs corresponding to the determined tire severity metrics, such as predicted tire aging and/or wear states, may for example be provided along with certain vehicle data as inputs to a traction model, which may be configured to provide an estimated traction status or one or more traction characteristics for the respective tire. The traction model may comprise "digital twin" virtual representations of physical parts, processes or systems wherein digital and physical data are paired and combined with learning systems such as for example artificial neural networks. Real vehicle data and/or tire data from a particular tire, vehicle or tire-vehicle system may be provided throughout the life cycle of the respective asset to generate a virtual representation of the vehicle tire for estimation of tire traction, wherein subsequent comparison of the estimated tire traction with a corresponding measured or determined actual tire traction may preferably be implemented as feedback for machine learning algorithms executed at the server level.

The traction model may in various embodiments utilize the results from prior testing, including for example stopping distance testing results, tire traction testing results, etc., as collected with respect to numerous tire-vehicle systems and associated combinations of values for input parameters (e.g., tire tread, inflation pressure, road surface characteristics, vehicle speed and acceleration, slip rate and angle, normal force, braking pressure and load), wherein a tire traction output may be effectively predicted for a given set of current vehicle data and tire data inputs.

In one embodiment, outputs from this traction model may be incorporated into an active safety system. The term "active safety systems" as used herein may preferably encompass such systems as are generally known to one of skill in the art, including but not limited to examples such as collision avoidance systems, advanced driver-assistance systems (ADAS), anti-lock braking systems (ABS), etc., which can be configured to utilize the traction model output information to achieve optimal performance. For example, collision avoidance systems are typically configured to take evasive action, such as automatically engaging the brakes of a host vehicle to avoid or mitigate a potential collision with a target vehicle, and enhanced information regarding the traction capabilities of the tires and accordingly the braking capabilities of the tire-vehicle system are eminently desirable.

In another embodiment, a ride-sharing autonomous fleet could use output data from the traction model to disable or otherwise selectively remove vehicles with low tread depth from use during inclement weather, or potentially to limit their maximum speeds.

In various embodiments, the method may further involve comparing a current wear value with respect to a threshold value to determine whether (or when) the tire requires intervention such as for example replacement. The method may alternatively or further include predicting wear values at one or more future points in time, wherein such predicted values may be compared to respective threshold values. As represented for example in FIG. 1, a feedback signal corresponding to the predicted tire wear status (e.g., predicted tread depth at a given distance, time, or the like) may be provided via an interface 120 to an onboard device 102 associated with the vehicle itself, or to a mobile device 140 associated with a user, such as for example integrating with a user interface configured to provide alerts or notice/recommendations that a tire should or soon will need to be replaced.

As another example, an autonomous vehicle fleet may comprise numerous vehicles having varying minimum tire wear status (e.g., tread depth) values, wherein the fleet management system may be configured to disable deployment of vehicles falling below a minimum threshold. The fleet management system may further implement varying minimum tread status values corresponding to wheel positions. The system may accordingly be configured to act upon a minimum tire tread value for each of a plurality of tires associated with a vehicle, or in an embodiment may calculate an aggregated tread status for the plurality of tires for comparison against a minimum threshold.

In various embodiments the method may further include data streaming even where threshold violations are not detected, wherein estimated and/or predicted wear values can be displayed in real-time on the local user interface and/or a remote display (e.g., associated with the fleet management server).

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Whereas certain preferred embodiments of the present invention may typically be described herein with respect to tire wear estimation for fleet management systems and more particularly for autonomous vehicle fleets or commercial trucking applications, the invention is in no way expressly limited thereto and the term "vehicle" as used herein unless otherwise stated may refer to an automobile, truck, or any equivalent thereof, whether self-propelled or otherwise, as may include one or more tires and therefore require accurate estimation or prediction of tire wear and potential disabling, replacement, or intervention in the form of for example direct vehicle control adjustments.

The term "user" as used herein unless otherwise stated may refer to a driver, passenger, mechanic, technician, fleet management personnel, or any other person or entity as may be, e.g., associated with a device having a user interface for providing features and steps as disclosed herein.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A tire monitoring method, comprising:
    collecting, via at least one data acquisition device mounted onboard a motor vehicle having a plurality of tires, at least signals corresponding to an ambient temperature and contained air temperatures for each of the plurality of tires;
    ascertaining oxidative aging characteristics for each of the plurality of tires, based on at least the collected ambient temperature and respective contained air temperature, and respective rates of accumulation thereof with respect to time and/or distance traveled;
    further ascertaining the oxidative aging characteristics for each of the plurality of tires with respect to a fixed reference ambient temperature, and respective rates of accumulation thereof with respect to time and/or distance traveled; and
    selectively generating and providing to an active safety system associated with the motor vehicle an output signal corresponding to monitored characteristics and respective rates of accumulation thereof for one or more of the plurality of tires, wherein one or more operations of the motor vehicle are controlled based at least in part on the output signal.

2. The method according to claim 1, wherein the oxidative aging characteristics are ascertained at least in part via Arrhenius reaction rate integration.

3. The method according to claim 1, further comprising:
    collecting, via the at least one data acquisition device, signals corresponding to one or more of vertical load, inflation pressure, and speed for each of the plurality of tires; and
    wherein the rates of accumulation of the oxidative aging characteristics are further ascertained with respect to the one or more of vertical load, inflation pressure, and speed for each of the plurality of tires.

4. The method according to claim 1, further comprising:
   identifying a respective position on the motor vehicle for each of the plurality of tires; and
   predicting a tire life state based on the ascertained characteristics, and the respective rates of accumulation thereof, for each respective position on the motor vehicle of the plurality of tires.

5. The method according to claim 4, wherein the output signal is selectively generated corresponding to a determined intervention event for one or more of the plurality of tires.

6. The method according to claim 1, further provided with respect to each of a plurality of motor vehicles in a defined fleet, and comprising:
   identifying at least a respective motor vehicle for each of the collected at least signals corresponding to the ambient temperature and the respective contained air temperatures for each of the corresponding plurality of tires; and
   predicting a tire life state based on the ascertained characteristics, and the respective rates of accumulation thereof, for each respective motor vehicle in the defined fleet.

7. The method according to claim 6, wherein the output signal is selectively generated corresponding to a determined intervention event for one or more of the plurality of motor vehicles.

8. The method according to claim 1, further provided with respect to each of a plurality of motor vehicles in each of a plurality of defined fleets, and comprising:
   identifying at least a respective motor vehicle and a respective fleet for each of the collected at least signals corresponding to the ambient temperature and the respective contained air temperatures for each of the corresponding plurality of tires; and
   predicting a tire life state based on the ascertained characteristics, and the respective rates of accumulation thereof, for each respective fleet.

9. The method according to claim 8, wherein the output signal is selectively generated corresponding to a determined intervention event for one or more of the plurality of fleets.

10. A tire monitoring system, comprising:
    at least one data acquisition device mounted onboard a motor vehicle having a plurality of tires, and configured to generate at least signals corresponding to an ambient temperature and contained air temperatures for each of the plurality of tires;
    a computing device communicatively linked to the at least one data acquisition device to receive the generated signals there from, wherein the computing device is further configured to:
        ascertain oxidative aging characteristics for each of the plurality of tires, based on at least the collected ambient temperature and respective contained air temperature, and respective rates of accumulation thereof with respect to time and/or distance traveled;
        further ascertain the oxidative aging characteristics for each of the plurality of tires with respect to a fixed reference ambient temperature, and respective rates of accumulation thereof with respect to time and/or distance traveled; and
        selectively generate and provide to an active safety system associated with the motor vehicle an output signal corresponding to monitored characteristics and respective rates of accumulation thereof for one or more of the plurality of tires, wherein one or more operations of the motor vehicle are controlled based at least in part on the output signal.

11. The system of claim 10, wherein the oxidative aging characteristics are ascertained at least in part via Arrhenius reaction rate integration.

12. The system of claim 10, wherein:
    the at least one data acquisition device is further configured to generate signals corresponding to one or more of vertical load, inflation pressure, and speed for each of the plurality of tires; and
    the rates of accumulation of the oxidative aging characteristics are further ascertained with respect to the one or more of vertical load, inflation pressure, and speed for each of the plurality of tires.

13. The system of claim 10, wherein the computing device is further configured to:
    identify a respective position on the motor vehicle for each of the plurality of tires; and
    predict a tire life state based on the ascertained characteristics, and the respective rates of accumulation thereof, for each respective position on the motor vehicle of the plurality of tires.

14. The system of claim 13, wherein the output signal is selectively generated corresponding to a determined intervention event for one or more of the plurality of tires.

15. The system of claim 10, wherein:
    the computing device is a cloud server communicatively linked to a plurality of data acquisition devices, at least one of the plurality of data acquisition devices provided with respect to each of a plurality of motor vehicles in a defined fleet; and
    the cloud server is configured to
        identify at least a respective motor vehicle for each of the collected at least signals corresponding to the ambient temperature and the respective contained air temperatures for each of the corresponding plurality of tires, and
        predict a tire life state based on the ascertained characteristics, and the respective rates of accumulation thereof, for each respective motor vehicle in the defined fleet.

16. The system of claim 15, wherein the output signal is selectively generated corresponding to a determined intervention event for one or more of the plurality of motor vehicles.

17. The system of claim 10, wherein:
    the computing device is a cloud server communicatively linked to a plurality of data acquisition devices, at least one of the plurality of data acquisition devices provided with respect to each of a plurality of motor vehicles in each of a plurality of defined fleets; and
    the cloud server is configured to
        identify at least a respective motor vehicle and a respective fleet for each of the collected at least signals corresponding to the ambient temperature and the respective contained air temperatures for each of the corresponding plurality of tires, and
        predict a tire life state based on the ascertained characteristics, and the respective rates of accumulation thereof, for each respective fleet.

18. The system of claim 17, wherein the output signal is selectively generated corresponding to a determined intervention event for one or more of the plurality of fleets.

19. A cloud server communicatively linked to at least one data acquisition device mounted onboard each of one or more motor vehicles having a plurality of tires, wherein the cloud server is configured to:

receive, from each of the at least one data acquisition device, at least signals corresponding to an ambient temperature and contained air temperatures for the respective plurality of tires;

ascertain oxidative aging characteristics for each of the plurality of tires, based on at least the collected ambient temperature and respective contained air temperature, and respective rates of accumulation thereof with respect to time and/or distance traveled;

further ascertain the oxidative aging characteristics for each of the plurality of tires with respect to a fixed reference ambient temperature, and respective rates of accumulation thereof with respect to time and/or distance traveled; and selectively generate and provide to an active safety system associated with the motor vehicle an output signal corresponding to monitored characteristics and respective rates of accumulation thereof for one or more of the plurality of tires, wherein one or more operations of the motor vehicle are controlled based at least in part on the output signal.

20. The cloud server of claim 19, wherein the oxidative aging characteristics are ascertained at least in part via Arrhenius reaction rate integration.

\* \* \* \* \*